United States Patent
Leser et al.

(10) Patent No.: US 9,102,802 B2
(45) Date of Patent: Aug. 11, 2015

(54) POLYMERIC MATERIAL FOR AN INSULATED CONTAINER

(71) Applicant: BERRY PLASTICS CORPORATION, Evansville, IN (US)

(72) Inventors: Chris K. Leser, Evansville, IN (US); Philip A. Driskill, Newburgh, IN (US); Charles T. Wallace, Evansville, IN (US); John B. Euler, Evansville, IN (US); Jason J. Paladino, Newburgh, IN (US); Milan C. Maravich, Newburgh, IN (US); Daniel O. Davis, Cynthiana, IN (US); Jeffrey A. Mann, Evansville, IN (US); Randy A. Bowlds, Evansville, IN (US); Svetlana I. Contrada, Manalapan, NJ (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 14/486,618

(22) Filed: Sep. 15, 2014

(65) Prior Publication Data

US 2015/0001435 A1    Jan. 1, 2015

Related U.S. Application Data

(63) Continuation of application No. 13/491,327, filed on Jun. 7, 2012, now Pat. No. 8,883,280.

(60) Provisional application No. 61/529,632, filed on Aug. 31, 2011, provisional application No. 61/618,604, filed on Mar. 30, 2012.

(51) Int. Cl.
*C08J 9/00* (2006.01)
*C08L 23/10* (2006.01)
(Continued)

(52) U.S. Cl.
CPC .............. *C08J 9/0061* (2013.01); *C08J 9/0023* (2013.01); *C08J 9/0066* (2013.01); *C08J 9/0095* (2013.01);
(Continued)

(58) Field of Classification Search
CPC .............. C08J 9/0061; C08J 9/06; C08J 9/12; C08J 9/00; C08J 9/122; C08J 9/0023; C08J 9/0066; C08J 9/0095; C08J 9/04; C08J 2201/03; C08J 2205/04; C08J 2323/04; C08J 2323/12; C08J 2423/12; E04B 1/78; C08L 23/04; C08L 23/12; C08L 23/06; C08L 23/08; C08L 23/10; C08L 23/14; B32B 33/00; B32B 1/02; B32B 1/08; B65D 1/65; B29D 22/00; B29D 23/00; Y10T 428/1476; Y10T 48/1348; Y10T 428/139; Y10T 428/1397; Y10T 428/1376; Y10T 428/28
USPC .............. 428/36.92, 304.4, 308.4, 35.6, 36.5, 428/36.9; 252/62; 220/660
See application file for complete search history.

(56) References Cited

U.S. PATENT DOCUMENTS 1,396,282 A    11/1921    Penn
1,435,120 A    11/1922    Holman
(Continued)

FOREIGN PATENT DOCUMENTS

CA    2291607    6/2000
CA    2765489    12/2010
(Continued)

OTHER PUBLICATIONS

International Search Report and Written Opinion dated Jan. 19, 2015, relating to International Application No. PCT/US2014/059312.
(Continued)

*Primary Examiner* — Michael C Miggins
(74) *Attorney, Agent, or Firm* — Barnes & Thornburg LLP

(57) ABSTRACT

A formulation includes a polymeric material, a nucleating agent, a blowing agent, and a surface active agent. The formulation can be used to form a container.

20 Claims, 6 Drawing Sheets

(51) Int. Cl.
| | |
|---|---|
| *C08J 9/04* | (2006.01) |
| *E04B 1/78* | (2006.01) |
| *C08L 23/04* | (2006.01) |
| *C08L 23/12* | (2006.01) |
| *C08L 23/06* | (2006.01) |
| *C08J 9/06* | (2006.01) |
| *C08J 9/12* | (2006.01) |
| *B32B 33/00* | (2006.01) |
| *B65D 1/40* | (2006.01) |
| *B32B 1/02* | (2006.01) |
| *B29D 22/00* | (2006.01) |
| *B29D 23/00* | (2006.01) |
| *B32B 1/08* | (2006.01) |
| *C08L 23/08* | (2006.01) |
| *C08L 23/14* | (2006.01) |

(52) U.S. Cl.
CPC .. *C08J 9/04* (2013.01); *C08J 9/122* (2013.01); *C08L 23/10* (2013.01); *B29D 22/00* (2013.01); *B29D 23/00* (2013.01); *B32B 1/02* (2013.01); *B32B 1/08* (2013.01); *B32B 33/00* (2013.01); *B65D 1/40* (2013.01); *C08J 9/00* (2013.01); *C08J 9/06* (2013.01); *C08J 9/12* (2013.01); *C08J 2201/03* (2013.01); *C08J 2205/04* (2013.01); *C08J 2323/04* (2013.01); *C08J 2323/12* (2013.01); *C08J 2423/12* (2013.01); *C08L 23/04* (2013.01); *C08L 23/06* (2013.01); *C08L 23/08* (2013.01); *C08L 23/12* (2013.01); *C08L 23/14* (2013.01); *E04B 1/78* (2013.01); *Y10T 428/139* (2015.01); *Y10T 428/1348* (2015.01); *Y10T 428/1376* (2015.01); *Y10T 428/1397* (2015.01); *Y10T 428/1476* (2015.01); *Y10T 428/28* (2015.01)

(56) References Cited

U.S. PATENT DOCUMENTS

| | | |
|---|---|---|
| 1,920,529 A | 8/1933 | Sidebotham |
| 1,969,030 A | 8/1934 | Page |
| 2,097,899 A | 11/1937 | Smith |
| 2,809,776 A | 10/1957 | Barrington |
| 3,312,383 A | 4/1967 | Shapiro |
| 3,327,038 A | 6/1967 | Fox |
| 3,344,222 A | 9/1967 | Shapiro |
| 3,468,467 A | 9/1969 | Amberg |
| 3,547,012 A | 12/1970 | Amberg |
| 3,583,624 A | 6/1971 | Peacock |
| 3,733,381 A | 5/1973 | Willette |
| 3,793,283 A | 2/1974 | Frailey |
| 3,846,349 A | 11/1974 | Harada |
| 3,967,991 A | 7/1976 | Shimano |
| 3,971,696 A | 7/1976 | Manfredi |
| 4,049,122 A | 9/1977 | Maxwell |
| 4,070,513 A | 1/1978 | Rhoads |
| 4,106,397 A | 8/1978 | Amberg |
| 4,171,085 A | 10/1979 | Doty |
| 4,197,948 A | 4/1980 | Amberg |
| 4,240,568 A | 12/1980 | Pool |
| 4,284,226 A | 8/1981 | Herbst |
| 4,298,331 A | 11/1981 | Mueller |
| 4,299,349 A | 11/1981 | Gilden |
| 4,300,891 A | 11/1981 | Bemiss |
| 4,349,400 A | 9/1982 | Gilden |
| 4,365,460 A | 12/1982 | Cress |
| 4,409,045 A | 10/1983 | Busse |
| 4,550,046 A | 10/1985 | Miller |
| 4,621,763 A | 11/1986 | Brauner |
| 4,706,873 A | 11/1987 | Schulz |
| 4,720,023 A | 1/1988 | Jeff |
| 4,878,970 A | 11/1989 | Schubert |
| 4,918,112 A | 4/1990 | Roox |
| 4,940,736 A | 7/1990 | Alteepping |
| 5,078,817 A | 1/1992 | Takagaki |
| 5,158,986 A | 10/1992 | Cha |
| 5,160,674 A | 11/1992 | Colton |
| 5,180,751 A | 1/1993 | Park |
| 5,286,428 A | 2/1994 | Hayashi |
| 5,308,568 A | 5/1994 | Lipp |
| 5,348,795 A | 9/1994 | Park |
| 5,366,791 A | 11/1994 | Carr |
| 5,385,260 A | 1/1995 | Gatcomb |
| 5,443,769 A | 8/1995 | Karabedian |
| 5,445,315 A | 8/1995 | Shelby |
| 5,490,631 A | 2/1996 | Iioka |
| 5,547,124 A | 8/1996 | Mueller |
| 5,605,936 A | 2/1997 | DeNicola, Jr. |
| 5,622,308 A | 4/1997 | Ito |
| 5,628,453 A | 5/1997 | MacLaughlin |
| 5,629,076 A | 5/1997 | Fukasawa |
| 5,759,624 A | 6/1998 | Neale |
| 5,765,710 A | 6/1998 | Bergerioux |
| 5,766,709 A | 6/1998 | Geddes |
| 5,769,311 A | 6/1998 | Morita |
| 5,819,507 A | 10/1998 | Kaneko |
| 5,840,139 A | 11/1998 | Geddes |
| 5,866,053 A | 2/1999 | Park |
| 5,868,309 A | 2/1999 | Sandstrom |
| 5,944,225 A | 8/1999 | Kawolics |
| 5,948,839 A | 9/1999 | Chatterjee |
| 6,007,437 A | 12/1999 | Schickert |
| 6,030,476 A | 2/2000 | Geddes |
| 6,034,144 A | 3/2000 | Shioya |
| 6,051,174 A | 4/2000 | Park |
| 6,071,580 A | 6/2000 | Bland |
| 6,103,153 A | 8/2000 | Park |
| 6,129,653 A | 10/2000 | Fredricks |
| 6,136,396 A | 10/2000 | Gilmer |
| 6,139,665 A | 10/2000 | Schmelzer |
| 6,142,331 A | 11/2000 | Breining |
| 6,169,122 B1 | 1/2001 | Blizard |
| 6,231,942 B1 | 5/2001 | Blizard |
| 6,235,380 B1 | 5/2001 | Tupil |
| 6,267,837 B1 | 7/2001 | Mitchell |
| 6,284,810 B1 | 9/2001 | Burnham |
| 6,294,115 B1 | 9/2001 | Blizard |
| 6,306,973 B1 | 10/2001 | Takaoka |
| 6,308,883 B1 | 10/2001 | Schmelzer |
| 6,319,590 B1 | 11/2001 | Geddes |
| 6,328,916 B1 | 12/2001 | Nishikawa |
| 6,376,059 B1 | 4/2002 | Anderson |
| 6,379,802 B2 | 4/2002 | Ito |
| 6,420,024 B1 | 7/2002 | Perez |
| 6,444,073 B1 | 9/2002 | Reeves |
| 6,468,451 B1 | 10/2002 | Perez |
| 6,472,473 B1 | 10/2002 | Ansems |
| RE37,932 E | 12/2002 | Baldwin |
| 6,512,019 B1 | 1/2003 | Agarwal |
| 6,521,675 B1 | 2/2003 | Wu |
| 6,541,105 B1 | 4/2003 | Park |
| 6,562,447 B2 | 5/2003 | Wu |
| 6,565,934 B1 | 5/2003 | Fredricks |
| 6,586,532 B1 | 7/2003 | Gauthy |
| 6,593,005 B2 | 7/2003 | Tau |
| 6,593,384 B2 | 7/2003 | Anderson |
| 6,613,811 B1 | 9/2003 | Pallaver |
| 6,616,434 B1 | 9/2003 | Burnham |
| 6,646,019 B2 | 11/2003 | Perez |
| 6,649,666 B1 | 11/2003 | Read |
| 6,713,139 B2 | 3/2004 | Usui |
| 6,720,362 B1 | 4/2004 | Park |
| 6,749,913 B2 | 6/2004 | Watanabe |
| 6,779,662 B2 | 8/2004 | Dorsey |
| 6,811,843 B2 | 11/2004 | DeBraal |
| 6,814,253 B2 | 11/2004 | Wong |
| 6,883,677 B2 | 4/2005 | Goeking |
| 6,884,377 B1 | 4/2005 | Burnham |
| 6,884,851 B2 | 4/2005 | Gauthy |
| 6,908,651 B2 | 6/2005 | Watanabe |
| 6,926,507 B2 | 8/2005 | Cardona |
| 6,926,512 B2 | 8/2005 | Wu |

(56) References Cited

U.S. PATENT DOCUMENTS

| | | |
|---|---|---|
| 7,070,852 B1 | 7/2006 | Reiners |
| 7,074,466 B2 | 7/2006 | DeBraal |
| 7,094,463 B2 | 8/2006 | Haas |
| 7,121,991 B2 | 10/2006 | Mannlein |
| 7,144,532 B2 | 12/2006 | Kim |
| 7,173,069 B2 | 2/2007 | Swennen |
| 7,234,629 B2 | 6/2007 | Ho |
| 7,281,650 B1 | 10/2007 | Milan |
| 7,355,089 B2 | 4/2008 | Chang |
| 7,361,720 B2 | 4/2008 | Pierini |
| 7,365,136 B2 | 4/2008 | Huovinen |
| 7,423,071 B2 | 9/2008 | Mogami |
| 7,458,504 B2 | 12/2008 | Robertson |
| 7,504,347 B2 | 3/2009 | Poon |
| 7,510,098 B2 | 3/2009 | Hartjes |
| 7,513,386 B2 | 4/2009 | Hartjes |
| 7,514,517 B2 | 4/2009 | Hoenig |
| 7,524,911 B2 | 4/2009 | Karjala |
| 7,557,147 B2 | 7/2009 | Martinez |
| 7,579,408 B2 | 8/2009 | Walton |
| 7,582,716 B2 | 9/2009 | Liang |
| 7,585,557 B2 | 9/2009 | Aylward |
| 7,592,397 B2 | 9/2009 | Markovich |
| 7,608,668 B2 | 10/2009 | Shan |
| 7,622,179 B2 | 11/2009 | Patel |
| 7,622,529 B2 | 11/2009 | Walton |
| 7,629,416 B2 | 12/2009 | Li |
| 7,655,296 B2 | 2/2010 | Haas |
| 7,662,881 B2 | 2/2010 | Walton |
| 7,666,918 B2 | 2/2010 | Prieto |
| 7,671,106 B2 | 3/2010 | Markovich |
| 7,671,131 B2 | 3/2010 | Hughes |
| 7,673,564 B2 | 3/2010 | Wolf |
| 7,687,442 B2 | 3/2010 | Walton |
| 7,695,812 B2 | 4/2010 | Peng |
| 7,714,071 B2 | 5/2010 | Hoenig |
| 7,732,052 B2 | 6/2010 | Chang |
| 7,737,061 B2 | 6/2010 | Chang |
| 7,737,215 B2 | 6/2010 | Chang |
| 7,741,397 B2 | 6/2010 | Liang |
| 7,754,814 B2 | 7/2010 | Barcus |
| 7,759,404 B2 | 7/2010 | Burgun |
| 7,786,216 B2 | 8/2010 | Soediono |
| 7,795,321 B2 | 9/2010 | Cheung |
| 7,803,728 B2 | 9/2010 | Poon |
| 7,811,644 B2 | 10/2010 | DeBraal |
| 7,818,866 B2 | 10/2010 | Hollis |
| 7,820,282 B2 | 10/2010 | Haas |
| 7,841,974 B2 | 11/2010 | Hartjes |
| 7,842,770 B2 | 11/2010 | Liang |
| 7,858,706 B2 | 12/2010 | Arriola |
| 7,863,379 B2 | 1/2011 | Kapur |
| 7,883,769 B2 | 2/2011 | Seth |
| 7,893,166 B2 | 2/2011 | Shan |
| 7,897,689 B2 | 3/2011 | Harris |
| 7,906,587 B2 | 3/2011 | Poon |
| 7,910,658 B2 | 3/2011 | Chang |
| 7,915,192 B2 | 3/2011 | Arriola |
| 7,918,005 B2 | 4/2011 | Hollis |
| 7,918,016 B2 | 4/2011 | Hollis |
| 7,922,071 B2 | 4/2011 | Robertson |
| 7,928,162 B2 | 4/2011 | Kiss |
| 7,935,740 B2 | 5/2011 | Dang |
| 7,947,367 B2 | 5/2011 | Poon |
| 7,951,882 B2 | 5/2011 | Arriola |
| 7,977,397 B2 | 7/2011 | Cheung |
| 7,989,543 B2 | 8/2011 | Karjala |
| 7,993,254 B2 | 8/2011 | Robertson |
| 7,998,579 B2 | 8/2011 | Lin |
| 7,998,728 B2 | 8/2011 | Rhoads |
| 8,003,176 B2 | 8/2011 | Ylitalo |
| 8,003,744 B2 | 8/2011 | Okamoto |
| 8,012,550 B2 | 9/2011 | Ylitalo |
| 8,026,291 B2 | 9/2011 | Handa |
| 8,043,695 B2 | 10/2011 | Ballard |
| 8,067,319 B2 | 11/2011 | Poon |
| 8,076,381 B2 | 12/2011 | Miyagawa |
| 8,076,416 B2 | 12/2011 | Ellul |
| 8,084,537 B2 | 12/2011 | Walton |
| 8,087,147 B2 | 1/2012 | Hollis |
| 8,105,459 B2 | 1/2012 | Alvarez |
| 8,119,237 B2 | 2/2012 | Peng |
| 8,124,234 B2 | 2/2012 | Weaver |
| 8,173,233 B2 | 5/2012 | Rogers |
| 8,198,374 B2 | 6/2012 | Arriola |
| 8,211,982 B2 | 7/2012 | Harris |
| 8,227,075 B2 | 7/2012 | Matsushita |
| 8,273,068 B2 | 9/2012 | Chang |
| 8,273,826 B2 | 9/2012 | Walton |
| 8,273,838 B2 | 9/2012 | Shan |
| 8,288,470 B2 | 10/2012 | Ansems |
| 8,304,496 B2 | 11/2012 | Weaver |
| 8,404,780 B2 | 3/2013 | Weaver |
| 8,435,615 B2 | 5/2013 | Tsuchida |
| 8,679,620 B2 | 3/2014 | Matsushita |
| 2001/0010849 A1 | 8/2001 | Blizard |
| 2002/0030296 A1 | 3/2002 | Geddes |
| 2002/0058126 A1 | 5/2002 | Kannankeril |
| 2002/0137851 A1 | 9/2002 | Kim |
| 2002/0144769 A1 | 10/2002 | Debraal |
| 2002/0172818 A1 | 11/2002 | DeBraal |
| 2003/0003251 A1 | 1/2003 | DeBraal |
| 2003/0017284 A1 | 1/2003 | Watanabe |
| 2003/0029876 A1 | 2/2003 | Giraud |
| 2003/0108695 A1 | 6/2003 | Freek |
| 2003/0138515 A1 | 7/2003 | Harfmann |
| 2003/0211310 A1 | 11/2003 | Haas |
| 2003/0228336 A1 | 12/2003 | Gervasio |
| 2003/0232210 A1 | 12/2003 | Haas |
| 2004/0031714 A1 | 2/2004 | Hanson |
| 2004/0038018 A1 | 2/2004 | Anderson |
| 2004/0115418 A1 | 6/2004 | Anderson |
| 2004/0170814 A1 | 9/2004 | VanHandel |
| 2005/0003122 A1 | 1/2005 | Debraal |
| 2005/0006449 A1 | 1/2005 | DAmato |
| 2005/0101926 A1 | 5/2005 | Ausen |
| 2005/0104365 A1 | 5/2005 | Haas |
| 2005/0121457 A1 | 6/2005 | Wilson |
| 2005/0147807 A1 | 7/2005 | Haas |
| 2005/0159496 A1 | 7/2005 | Bambara |
| 2005/0184136 A1 | 8/2005 | Baynum, III |
| 2005/0236294 A1 | 10/2005 | Herbert |
| 2005/0256215 A1 | 11/2005 | Burnham |
| 2005/0272858 A1 | 12/2005 | Pierini |
| 2005/0288383 A1 | 12/2005 | Haas |
| 2006/0000882 A1 | 1/2006 | Darzinskas |
| 2006/0095151 A1 | 5/2006 | Mannlein |
| 2006/0135699 A1 | 6/2006 | Li |
| 2006/0148920 A1 | 7/2006 | Musgrave |
| 2006/0178478 A1 | 8/2006 | Ellul |
| 2006/0198983 A1 | 9/2006 | Patel |
| 2006/0199006 A1 | 9/2006 | Poon |
| 2006/0199030 A1 | 9/2006 | Liang |
| 2006/0199744 A1 | 9/2006 | Walton |
| 2006/0199872 A1 | 9/2006 | Prieto |
| 2006/0199884 A1 | 9/2006 | Hoenig |
| 2006/0199887 A1 | 9/2006 | Liang |
| 2006/0199896 A1 | 9/2006 | Walton |
| 2006/0199897 A1 | 9/2006 | Karjala |
| 2006/0199905 A1 | 9/2006 | Hughes |
| 2006/0199906 A1 | 9/2006 | Walton |
| 2006/0199907 A1 | 9/2006 | Chang |
| 2006/0199908 A1 | 9/2006 | Cheung |
| 2006/0199910 A1 | 9/2006 | Walton |
| 2006/0199911 A1 | 9/2006 | Markovich |
| 2006/0199912 A1 | 9/2006 | Fuchs |
| 2006/0199914 A1 | 9/2006 | Harris |
| 2006/0199930 A1 | 9/2006 | Shan |
| 2006/0199931 A1 | 9/2006 | Poon |
| 2006/0199933 A1 | 9/2006 | Okamoto |
| 2006/0205833 A1 | 9/2006 | Martinez |
| 2006/0211819 A1 | 9/2006 | Hoenig |
| 2006/0234033 A1 | 10/2006 | Nishikawa |
| 2006/0289609 A1 | 12/2006 | Fritz |

(56) References Cited

U.S. PATENT DOCUMENTS

| | | |
|---|---|---|
| 2006/0289610 A1 | 12/2006 | Kling |
| 2007/0010616 A1 | 1/2007 | Kapur |
| 2007/0032600 A1 | 2/2007 | Mogami |
| 2007/0056964 A1 | 3/2007 | Holcomb |
| 2007/0065615 A1 | 3/2007 | Odle |
| 2007/0066756 A1 | 3/2007 | Poon |
| 2007/0078222 A1 | 4/2007 | Chang |
| 2007/0095837 A1 | 5/2007 | Meier |
| 2007/0112127 A1 | 5/2007 | Soediono |
| 2007/0141188 A1 | 6/2007 | Kim |
| 2007/0155900 A1 | 7/2007 | Chang |
| 2007/0167315 A1 | 7/2007 | Arriola |
| 2007/0167575 A1 | 7/2007 | Weaver |
| 2007/0167578 A1 | 7/2007 | Arriola |
| 2007/0202330 A1 | 8/2007 | Peng |
| 2007/0219334 A1 | 9/2007 | Shan |
| 2008/0118738 A1 | 5/2008 | Boyer |
| 2008/0121681 A1 | 5/2008 | Wiedmeyer |
| 2008/0156857 A1 | 7/2008 | Johnston |
| 2008/0177242 A1 | 7/2008 | Chang |
| 2008/0227877 A1 | 9/2008 | Stadlbauer |
| 2008/0234435 A1 | 9/2008 | Chang |
| 2008/0260996 A1 | 10/2008 | Heilman |
| 2008/0269388 A1 | 10/2008 | Markovich |
| 2008/0280517 A1 | 11/2008 | Chang |
| 2008/0281037 A1 | 11/2008 | Karjala |
| 2008/0311812 A1 | 12/2008 | Arriola |
| 2009/0042472 A1 | 2/2009 | Poon |
| 2009/0068402 A1 | 3/2009 | Yoshida |
| 2009/0069523 A1 | 3/2009 | Itakura |
| 2009/0076216 A1 | 3/2009 | Kiss |
| 2009/0105417 A1 | 4/2009 | Walton |
| 2009/0110944 A1 | 4/2009 | Aguirre |
| 2009/0170679 A1 | 7/2009 | Hartjes |
| 2009/0220711 A1 | 9/2009 | Chang |
| 2009/0247033 A1 | 10/2009 | Peng |
| 2009/0263645 A1 | 10/2009 | Barger |
| 2009/0275690 A1 | 11/2009 | Weaver |
| 2009/0324914 A1 | 12/2009 | Lieng |
| 2010/0025073 A1 | 2/2010 | Fagrell |
| 2010/0028568 A1 | 2/2010 | Weaver |
| 2010/0029827 A1 | 2/2010 | Ansems |
| 2010/0040818 A1 | 2/2010 | Farha |
| 2010/0055358 A1 | 3/2010 | Weaver |
| 2010/0069574 A1 | 3/2010 | Shan |
| 2010/0093942 A1 | 4/2010 | Silvis |
| 2010/0137118 A1 | 6/2010 | Chang |
| 2010/0168267 A1 | 7/2010 | Dang |
| 2010/0181328 A1 | 7/2010 | Cook |
| 2010/0181370 A1 | 7/2010 | Berbert |
| 2010/0196610 A1 | 8/2010 | Chang |
| 2010/0240818 A1 | 9/2010 | Walton |
| 2010/0279571 A1 | 11/2010 | Poon |
| 2010/0324202 A1 | 12/2010 | Bafna |
| 2011/0003929 A1 | 1/2011 | Soediono |
| 2011/0008570 A1 | 1/2011 | Seth |
| 2011/0009513 A1 | 1/2011 | Chaudhary |
| 2011/0091688 A1 | 4/2011 | Maurer |
| 2011/0104414 A1 | 5/2011 | Onodera |
| 2011/0111150 A1 | 5/2011 | Matsuzaki |
| 2011/0118370 A1 | 5/2011 | Jiang |
| 2011/0118416 A1 | 5/2011 | Arriola |
| 2011/0124818 A1 | 5/2011 | Arriola |
| 2011/0136959 A1 | 6/2011 | Brandstetter |
| 2011/0144240 A1 | 6/2011 | Harris |
| 2011/0217492 A1 | 9/2011 | Stamatiou |
| 2011/0229693 A1 | 9/2011 | Maurer |
| 2011/0230108 A1 | 9/2011 | Arriola |
| 2011/0318560 A1 | 12/2011 | Yun |
| 2012/0004087 A1 | 1/2012 | Tharayil |
| 2012/0024873 A1 | 2/2012 | Roseblade |
| 2012/0028065 A1 | 2/2012 | Bafna |
| 2012/0041148 A1 | 2/2012 | Bafna |
| 2012/0043374 A1 | 2/2012 | Lemon |
| 2012/0045603 A1 | 2/2012 | Zerafati |
| 2012/0108714 A1 | 5/2012 | Wittner |
| 2012/0108741 A1 | 5/2012 | Wu |
| 2012/0108743 A1 | 5/2012 | Krishnaswamy |
| 2012/0125926 A1 | 5/2012 | Iyori |
| 2012/0132699 A1 | 5/2012 | Mann |
| 2012/0178896 A1 | 7/2012 | Bastioli |
| 2012/0184657 A1 | 7/2012 | Lake |
| 2012/0193365 A1 | 8/2012 | Humphries |
| 2012/0199278 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |
| 2012/0225961 A1 | 9/2012 | VanHorn |
| 2012/0237734 A1 | 9/2012 | Maurer |
| 2012/0267368 A1 | 10/2012 | Wu |
| 2012/0270039 A1 | 10/2012 | Tynys |
| 2012/0295994 A1 | 11/2012 | Bernreitner |
| 2012/0318805 A1 | 12/2012 | Leser |
| 2012/0318807 A1 | 12/2012 | Leser |
| 2013/0023598 A1 | 1/2013 | Song |
| 2013/0032963 A1 | 2/2013 | Tokiwa |
| 2013/0052385 A1 | 2/2013 | Leser |
| 2013/0280517 A1 | 10/2013 | Buehring |
| 2013/0303645 A1 | 11/2013 | Dix |

FOREIGN PATENT DOCUMENTS

| | | |
|---|---|---|
| CN | 1288427 | 3/2001 |
| CN | 101429309 | 5/2009 |
| DE | 2831240 C | 3/1988 |
| DE | 102006025612 A1 | 11/2007 |
| EP | 0086869 | 8/1983 |
| EP | 0161597 | 11/1985 |
| EP | 0318167 | 5/1989 |
| EP | 0570221 | 11/1993 |
| EP | 0659647 | 6/1995 |
| EP | 0972727 | 1/2000 |
| EP | 0796199 | 2/2001 |
| EP | 0940240 | 10/2002 |
| EP | 1308263 | 5/2003 |
| EP | 1479716 | 11/2004 |
| EP | 1666530 | 6/2006 |
| EP | 1754744 | 2/2007 |
| EP | 1921023 A1 | 5/2008 |
| EP | 1939099 | 7/2008 |
| EP | 2266894 | 12/2010 |
| EP | 2386584 A1 | 11/2011 |
| GB | 1078326 | 8/1967 |
| JP | 52123043 U | 10/1977 |
| JP | 58029618 | 2/1983 |
| JP | 3140847 | 1/1994 |
| JP | P310847 | 12/2000 |
| JP | 2001310429 | 11/2001 |
| JP | 2003292663 | 10/2003 |
| JP | 2004018101 | 1/2004 |
| JP | 2004168421 A | 6/2004 |
| JP | 2006096390 | 4/2006 |
| JP | 2006130814 A | 5/2006 |
| JP | 2009066856 A | 4/2009 |
| JP | 2009190756 A | 8/2009 |
| KR | 100306320 | 10/2001 |
| KR | 2003036558 | 5/2003 |
| KR | 2004017234 | 2/2004 |
| KR | 101196666 | 11/2012 |
| WO | 9413460 | 6/1994 |
| WO | 9729150 | 8/1997 |
| WO | 9816575 | 4/1998 |
| WO | 0119733 | 3/2001 |
| WO | 0132758 | 5/2001 |
| WO | 0153079 | 7/2001 |
| WO | 03076497 | 9/2003 |
| WO | 03099913 | 12/2003 |
| WO | 2004104075 | 12/2004 |
| WO | 2006042908 | 4/2006 |
| WO | 2006124369 | 11/2006 |
| WO | 2007020074 | 2/2007 |
| WO | 2008030953 | 3/2008 |
| WO | 2008038750 | 4/2008 |
| WO | 2008045944 | 4/2008 |

(56) References Cited

FOREIGN PATENT DOCUMENTS

| WO | 2008057878 | | 5/2008 |
|---|---|---|---|
| WO | 2008080111 | | 7/2008 |
| WO | 2009035580 | | 3/2009 |
| WO | 2010006272 | | 1/2010 |
| WO | 2010019146 | | 2/2010 |
| WO | 2010076701 | A1 | 7/2010 |
| WO | 2010111869 | | 10/2010 |
| WO | 2011005856 | | 1/2011 |
| WO | 2011036272 | A2 | 3/2011 |
| WO | 2011076637 | | 6/2011 |
| WO | 2011141044 | | 11/2011 |
| WO | 2012020106 | | 2/2012 |
| WO | 2012025584 | | 3/2012 |
| WO | 2012044730 | | 4/2012 |
| WO | 2012055797 | | 5/2012 |
| WO | 2012099682 | | 7/2012 |

OTHER PUBLICATIONS

International Search Report dated Jan. 19, 2015, relating to International Application No. PCT/US2014/059216.
Office Action dated Feb. 2, 2015 for U.S. Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Spanish Search Report of Application No. 201390099, dated Feb. 9, 2015.
Borealis AG, DAPLOY(TM) HMS Polypropylene for Foam Extrusion, 2010, 20 pages.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report and Written Opinion dated Jul. 3, 2014, relating to International Application No. PCT/US2014/025697.
International Search Report and Written Opinion dated Sep. 17, 2013, relating to International Application No. PCT/US2012/041395.
International Search Report dated Feb. 26, 2013, relating to International Application No. PCT/US2012/043018.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 29, 2013, relating to International Application No. PCT/US2012/043016, 25 pages.
International Search Report dated Jul. 30, 2012, relating to International Application No. PCT/US2012/041397.
International Search Report dated Mar. 11, 2014, relating to International Application No. PCT/US2013/66811.
International Search Report dated Nov. 19, 2012, relating to International Application No. PCT/US2012/041395.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.
Machine English translation of JP 2006-130814.
Office action dated Apr. 11, 2014 for U.S. Appl. No. 13/526,417.
Office Action dated Aug. 21, 2014 for U.S. Appl. No. 13/526,454.
Office Action dated Jul. 25, 2014 for U.S. Appl. No. 13/525,640.
Office Action dated Sep. 25, 2014 for U.S. Appl. No. 13/526,417.
Office Action dated Oct. 10, 2014 for U.S. Appl. No. 14/106,358.
Office Action dated Oct. 16, 2014 for U.S. Appl. No. 14/106,212.
Office Action dated Aug. 19, 2014 for Chinese Application No. 201280035667.4.
European Search Report of Application No. 12861450.0, dated Nov. 21, 2014.
International Search Report dated Nov. 7, 2014, relating to International Application No. PCT/US2014/51508.
New Zealand First Examination Report for Application No. 619616 dated Oct. 10, 2014.
New Zealand First Examination Report for Application No. 621219 dated Nov. 17, 2014.
Third-Party Submission Under 37 CFR 1.290 filed on Dec. 9, 2014 in U.S. Appl. No. 14/063,252.
Machine English translation of EP0086869.
Singapore Office Action dated Dec. 18, 2014 for Singapore Application No. 2014002273.
Third-Party Submission Under 37 CFR 1.290 filed on Feb. 26, 2015 in U.S. Appl. No. 13/491,007.
Certified English translation of EP0086869.
Office Action dated Apr. 30, 2015 for U.S. Appl. No. 14/462,073.
Office Action dated Apr. 14, 2015 for U.S. Appl. No. 14/106,212.
Office Action dated Apr. 10, 2015 for U.S. Appl. No. 14/106,358.
English translation of Spanish Search Report of Application No. 201490025, dated Apr. 20, 2015.
Spanish Search Report for Application No. 201490025, dated Apr. 20, 2015.
Office Action dated Jun. 23, 2015 for U.S. Appl. No. 13/525,640.
Third Party Submission Under 37 CFR 1.290 in U.S. Appl. No. 14/188,504 submitted May 11, 2015 and May 27, 2015 (43 pages).
Naguib et al., "Fundamental Foaming Mechanisms Governing the Volume Expansion of Extruded Polypropylene Foams," Journal of Applied Polymer Science, vol. 91, pp. 2661-2668, 2004 (10 pages).
Wang et al., "Extending PP\s Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).

POLYMERIC MATERIAL FOR AN INSULATED CONTAINER

PRIORITY CLAIM

This application is a continuation of U.S. application Ser. No. 13/491,327, filed Jun. 7, 2012, which claims priority under 35 U.S.C. §119(e) to U.S. Provisional Application Ser. No. 61/529,632, filed Aug. 31, 2011 and U.S. Provisional Application Ser. No. 61/618,604, filed Mar. 30, 2012, each of which is expressly incorporated by reference herein.

BACKGROUND

The present disclosure relates to polymeric materials that can be formed to produce a container, and in particular, polymeric materials that insulate. More particularly, the present disclosure relates to polymer-based formulations that can be formed to produce an insulated non-aromatic polymeric material.

SUMMARY

A polymeric material in accordance with the present disclosure includes a polymeric resin and cell-forming agents. In illustrative embodiments, a blend of polymeric resins and cell-forming agents is extruded or otherwise formed to produce an insulated cellular non-aromatic polymeric material.

In illustrative embodiments, an insulative cellular non-aromatic polymeric material produced in accordance with the present disclosure can be formed to produce an insulative cup or other product. Polypropylene resin is used to form the insulative cellular non-aromatic polymeric material in illustrative embodiments.

In illustrative embodiments, an insulative cellular non-aromatic polymeric material comprises a polypropylene base resin having a high melt strength, a polypropylene copolymer or homopolymer (or both), and cell-forming agents including at least one nucleating agent and a blowing agent such as carbon dioxide. In illustrative embodiments, the insulative cellular non-aromatic polymeric material further comprises a slip agent. The polypropylene base resin has a broadly distributed unimodal (not bimodal) molecular weight distribution.

In illustrative embodiments, a polypropylene-based formulation in accordance with the present disclosure is heated and extruded in two stages to produce a tubular extrudate (in an extrusion process) that can be sliced to provide a strip of insulative cellular non-aromatic polymeric material. A blowing agent in the form of an inert gas is introduced into a molten resin in the first extrusion stage in illustrative embodiments.

In illustrative embodiments, an insulative cup is formed using the strip of insulative cellular non-aromatic polymeric material. The insulative cup includes a body having a sleeve-shaped side wall and a floor coupled to the body to cooperate with the side wall to form an interior region for storing food, liquid, or any suitable product. The body also includes a rolled brim coupled to an upper end of the side wall and a floor mount coupled to a lower end of the side wall and to the floor.

The insulative cellular non-aromatic polymeric material is configured in accordance with the present disclosure to provide means for enabling localized plastic deformation in at least one selected region of the body (e.g., the side wall, the rolled brim, the floor mount, and a floor-retaining flange included in the floor mount) to provide (1) a plastically deformed first material segment having a first density in a first portion of the selected region of the body and (2) a second material segment having a relatively lower second density in an adjacent second portion of the selected region of the body. In illustrative embodiments, the first material segment is thinner than the second material segment.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic and perspective view of a material-forming process in accordance with the present disclosure showing that the material-forming process includes, from left to right, a formulation of insulative cellular non-aromatic polymeric material being placed into a hopper that is fed into a first extrusion zone of a first extruder where heat and pressure are applied to form molten resin and showing that a blowing agent is injected into the molten resin to form an extrusion resin mixture that is fed into a second extrusion zone of a second extruder where the extrusion resin mixture exits and expands to form an extrudate which is slit to form a strip of insulative cellular non-aromatic polymeric material;

FIG. 2 is a perspective view of an insulative cup made from a strip of material including the insulative cellular non-aromatic polymeric material of FIG. 1 showing that the insulative cup includes a body and a floor and showing that four regions of the body have been broken away to reveal localized areas of plastic deformation that provide for increased density in those areas while maintaining a predetermined insulative characteristic in the body;

FIG. 6 is a partial section view taken along line 5-5 of FIG. 2 showing the first region is in the side wall of the body;

FIG. 7 is a partial section view taken along line 5-5 of FIG. 2 showing the second region is in the rolled brim of the body;

FIG. 8 is a partial section view taken along line 5-5 of FIG. 2 showing the third region is in a connecting web included in the floor mount of the body;

FIG. 9 is a partial section view taken along line 5-5 of FIG. 2 showing the fourth region is in a web-support ring included in the floor mount of the body.

DETAILED DESCRIPTION

An insulative cellular non-aromatic polymeric material produced in accordance with the present disclosure can be formed to produce an insulative cup 10 as suggested in FIGS. 2-9. As an example, the insulative cellular non-aromatic polymeric material comprises a polypropylene base resin having a high melt strength, a polypropylene copolymer or homopolymer (or both), and cell-forming agents including at least one nucleating agent and a blowing agent such as carbon dioxide. As a further example, the insulative cellular non-aromatic polymeric material further comprises a slip agent. The polypropylene base resin has a broadly distributed unimodal (not bimodal) molecular weight distribution.

Figure 1:
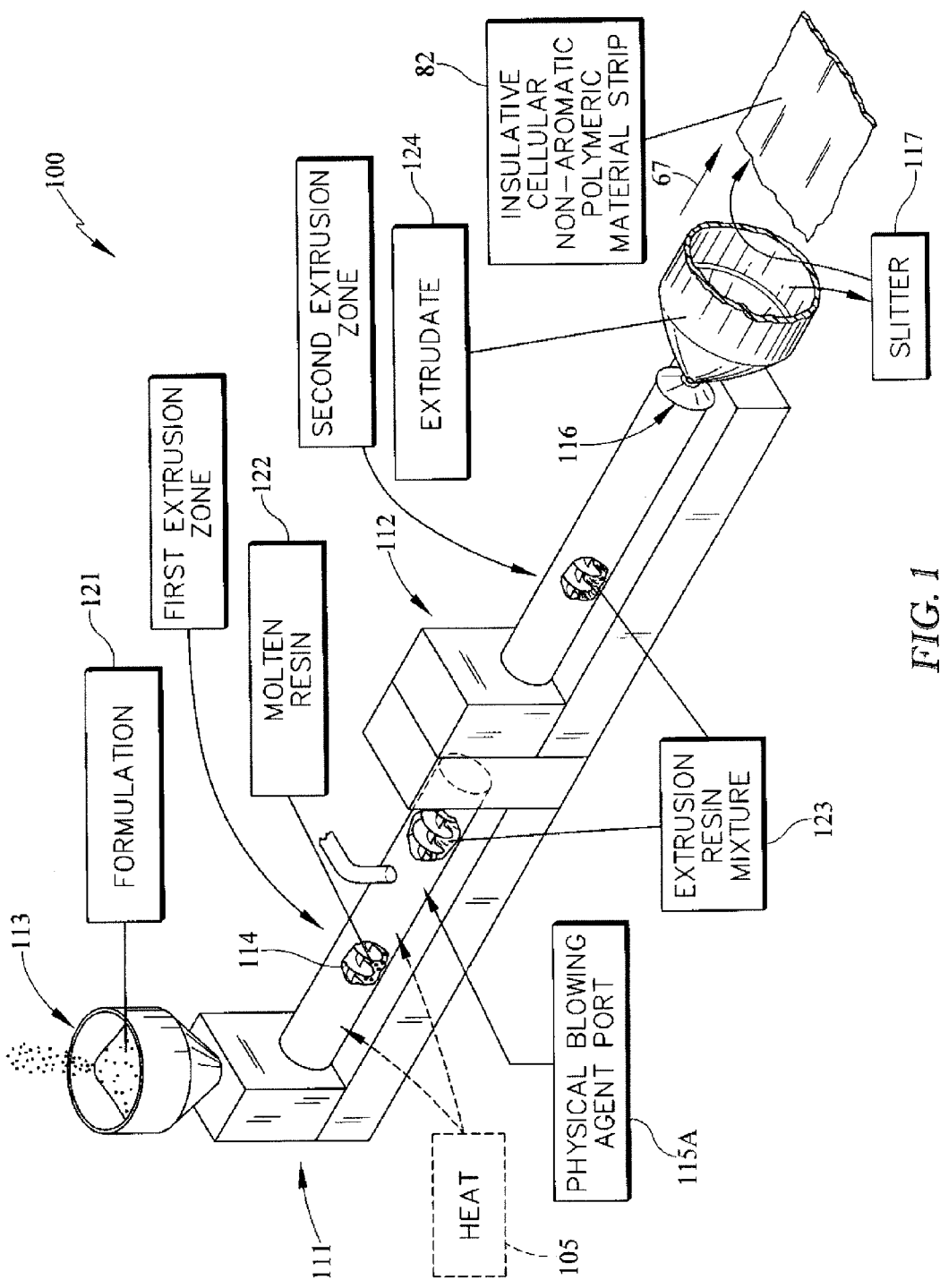

A material-forming process 100 uses a polypropylene-based formulation 121 in accordance with the present disclosure to produce a strip 82 of insulative cellular non-aromatic polymeric material as shown in FIG. 1. Formulation 121 is heated and extruded in two stages to produce a tubular extrudate 124 that can be slit to provide strip 82 of insulative cellular non-aromatic polymeric material as illustrated, for example, in FIG. 1. A blowing agent in the form of a liquified inert gas is introduced into a molten resin 122 in the first extrusion zone.

Figures 2, 3:
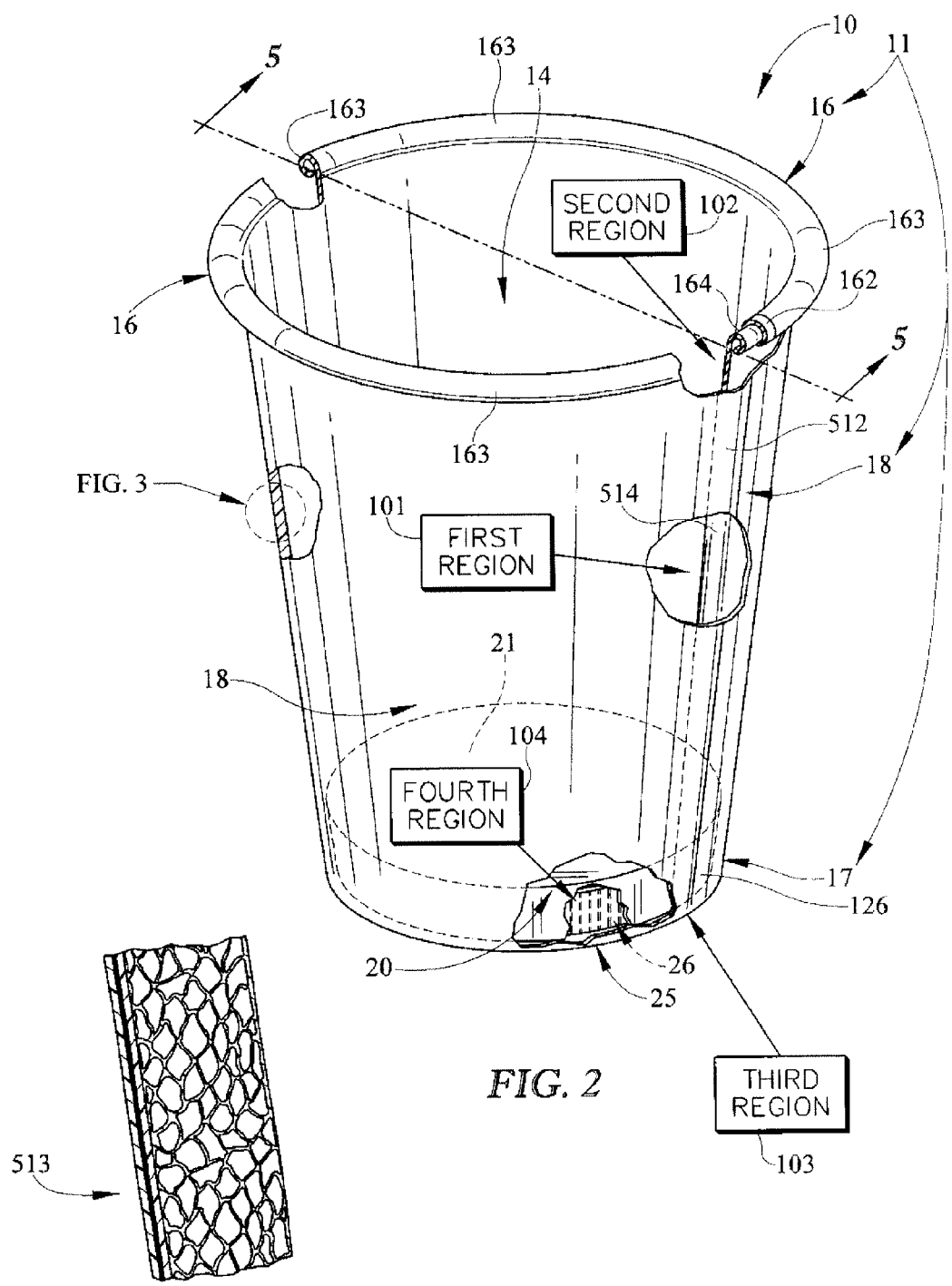
FIG. 3 is an enlarged sectional view of a portion of a side wall included in the body of the insulative cup of FIG. 2 showing that the side wall is made from a sheet that includes, from left to right, a skin including a film, an ink layer, and an adhesive layer, and the strip of insulative cellular non-aromatic polymeric material of FIG. 1.
Figure 4:
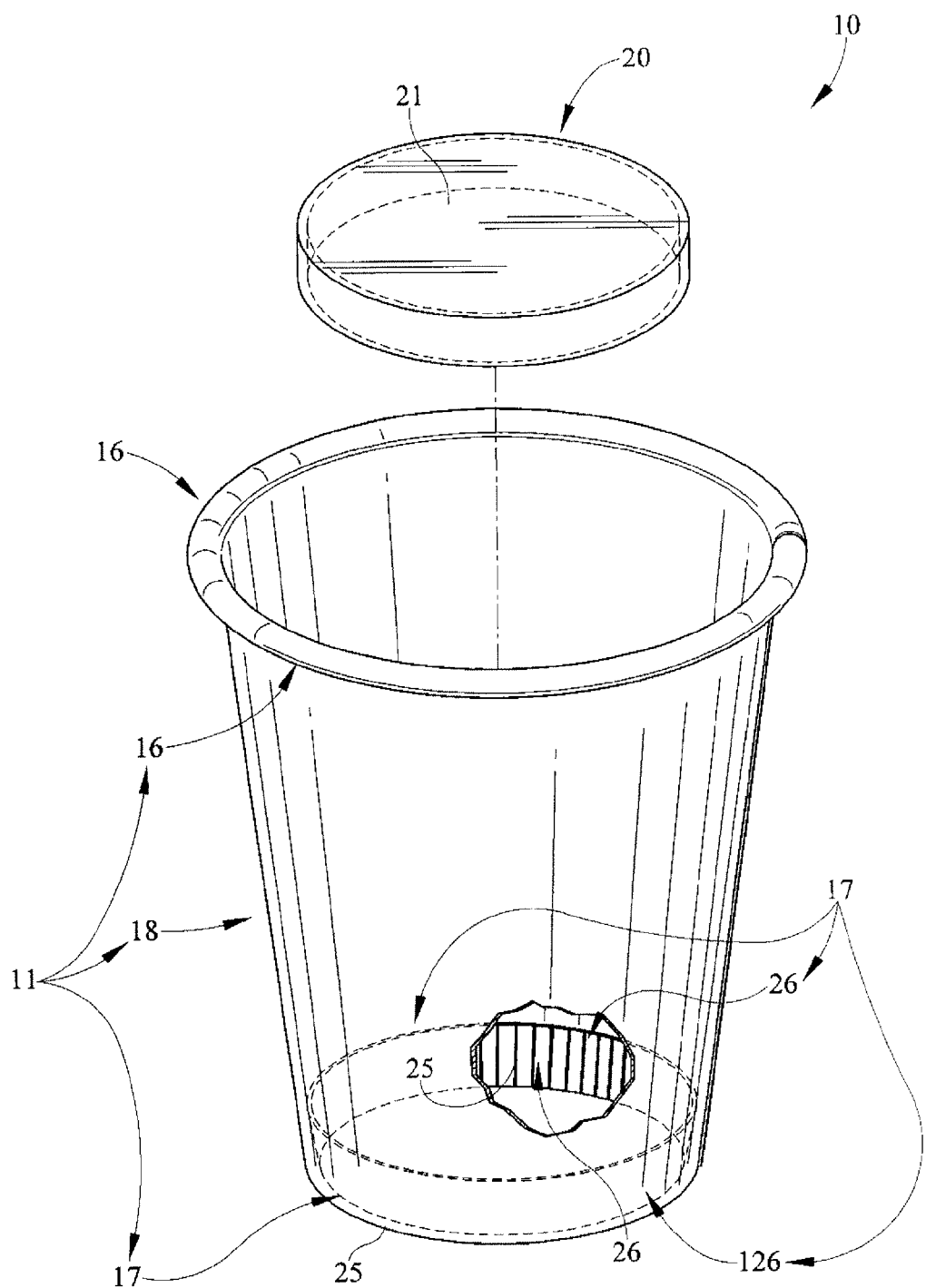
FIG. 4 is an exploded assembly view of the insulative cup of FIG. 2 showing that the insulative cup includes, from top to bottom, the floor and the body including a rolled brim, the side wall, and a floor mount configured to interconnect the floor and the side wall as shown in FIG. 2.
Figure 5:
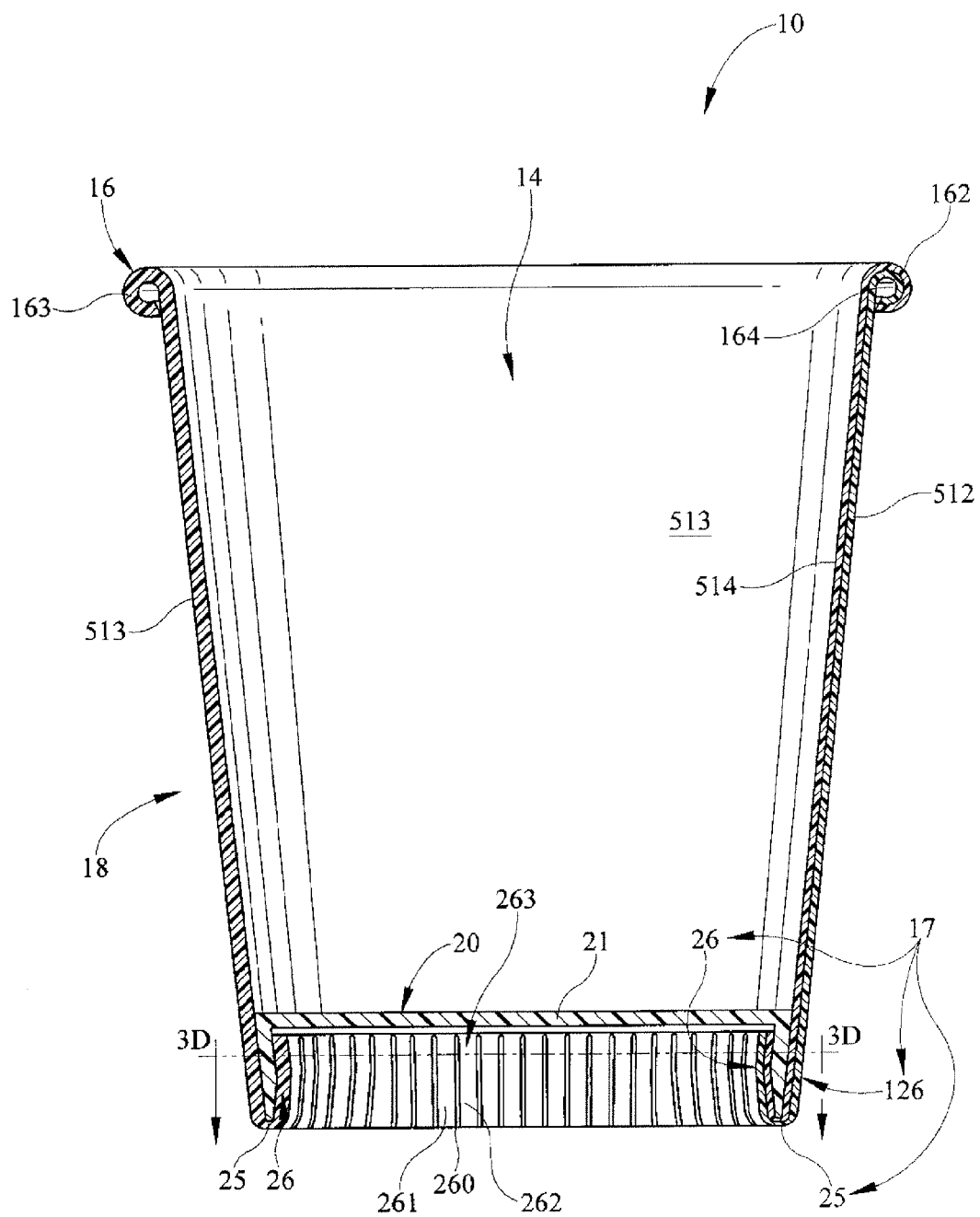
FIG. 5 is a sectional view taken along line 5-5 of FIG. 2 showing that the side wall included in the body of the insulative cup includes a generally uniform thickness and that the floor is coupled to the floor mount included in the body.

Insulative cellular non-aromatic polymeric material is used to form insulative cup 10. Insulative cup 10 includes a body 11 having a sleeve-shaped side wall 18 and a floor 20 as shown in FIGS. 2 and 4. Floor 20 is coupled to body 11 and cooperates with side wall 18 to form an interior region 14 therebetween for storing food, liquid, or any suitable product. Body 11 also includes a rolled brim 16 coupled to an upper end of side wall 18 and a floor mount 17 coupled to a lower end of side wall 18 and to floor 20 as shown in FIG. 5.

Insulative cellular non-aromatic polymeric material is configured in accordance with the present disclosure to provide means for enabling localized plastic deformation in at least one selected region of body 11 (e.g., side wall 18, rolled brim 16, floor mount 17, and a floor-retaining flange 26 included in floor mount 17) to provide (1) a plastically deformed first material segment having a first density in a first portion of the selected region of body 11 and (2) a second material segment having a relatively lower second density in an adjacent second portion of the selected region of body 11 as suggested, for example, in FIGS. 2 and 6-9. In illustrative embodiments, the first material segment is thinner than the second material segment.

One aspect of the present disclosure provides a formulation for manufacturing an insulative cellular non-aromatic polymeric material. As referred to herein, an insulative cellular non-aromatic polymeric material refers to an extruded structure having cells formed therein and has desirable insulative properties at given thicknesses. Another aspect of the present disclosure provides a resin material for manufacturing an extruded structure of insulative cellular non-aromatic polymeric material. Still another aspect of the present disclosure provides an extrudate comprising an insulative cellular non-aromatic polymeric material. Yet another aspect of the present disclosure provides a structure of material formed from an insulative cellular non-aromatic polymeric material. A further aspect of the present disclosure provides a container formed from an insulative cellular non-aromatic polymeric material.

In exemplary embodiments, a formulation includes at least one polymeric material. In one exemplary embodiment a primary or base polymer comprises a high melt strength polypropylene that has long chain branching. Long chain branching occurs by the replacement of a substituent, e.g., a hydrogen atom, on a monomer subunit, by another covalently bonded chain of that polymer, or, in the case of a graft copolymer, by a chain of another type. For example, chain transfer reactions during polymerization could cause branching of the polymer. Long chain branching is branching with side polymer chain lengths longer than the average critical entanglement distance of a linear polymer chain. Long chain branching is generally understood to include polymer chains with at least 20 carbon atoms depending on specific monomer structure used for polymerization. Another example of branching is by crosslinking of the polymer after polymerization is complete. Some long chain branch polymers are formed without crosslinking. Polymer chain branching can have a significant impact on material properties. Final selection of a polypropylene material may take into account the properties of the end material, the additional materials needed during formulation, as well as the conditions during the extrusion process. In exemplary embodiments high melt strength polypropylenes may be materials that can hold a gas (as discussed hereinbelow), produce desirable cell size, have desirable surface smoothness, and have an acceptable odor level (if any).

One illustrative example of a suitable polypropylene base resin is DAPLOY™ WB140 homopolymer (available from Borealis A/S), a high melt strength structural isomeric modified polypropylene homopolymer (melt strength=36, as tested per ISO 16790 which is incorporated by reference herein, melting temperature=325.4° F. (163° C.) using ISO 11357, which is incorporated by reference herein).

Borealis DAPLOY™ WB140 properties (as described in a Borealis product brochure):

| Property | Typical Value | Unit | Test Method |
|---|---|---|---|
| Melt Flow Rate (230/2.16) | 2.1 | g/10 min | ISO 1133 |
| Flexural Modulus | 1900 | MPa | ISO 178 |
| Tensile Strength at Yield | 40 | MPa | ISO 527-2 |
| Elongation at Yield | 6 | % | ISO 527-2 |
| Tensile Modulus | 2000 | MPa | ISO 527-2 |
| Charpy impact strength, notched (+23° C.) | 3.0 | kJ/m$^2$ | ISO 179/1eA |
| Charpy impact strength, notched (−20° C.) | 1.0 | kJ/m$^2$ | ISO 179/1eA |
| Heat Deflection Temperature A (at 1.8 MPa load) | 60 | ° C. | ISO 75-2 Method A |
| Heat Deflection Temperature B (at 0.46 MPa load) | 110 | ° C. | ISO 75-2 Method B |

Other polypropylene polymers having suitable melt strength, branching, and melting temperature may also be used. Several base resins may be used and mixed together.

In certain exemplary embodiments, a secondary polymer may be used with the base polymer. The secondary polymer may be, for example, a polymer with sufficient crystallinity. In exemplary embodiments the secondary polymer may be at least one crystalline polypropylene homopolymer, an impact copolymer, mixtures thereof or the like. One illustrative example is a high crystalline polypropylene homopolymer, available as F020HC from Braskem. Another illustrative example is a polymer commercially available as PRO-FAX SC204™ (available from LyndellBasell Industries Holdings, B.V.). Another illustrative example is Homo PP—INSPIRE 222, available from Braskem. In one aspect the polypropylene may have a high degree of crystallinity, i.e., the content of the crystalline phase exceeds 51% (as tested using differential scanning calorimetry) at 10° C./min cooling rate. In exemplary embodiments several different secondary polymers may be used and mixed together.

In exemplary embodiments, the secondary polymer may be or may include polyethylene. In exemplary embodiments, the secondary polymer may include low density polyethylene, linear low density polyethylene, high density polyethylene, ethylene-vinyl acetate copolymers, ethylene-ethylacrylate copolymers, ethylene-acrylic acid copolymers, mixtures of at least two of the foregoing and the like. The use of non-polypropylene materials may affect recyclability, insulation, microwavability, impact resistance, or other properties, as discussed further hereinbelow.

One or more nucleating agents are used to provide and control nucleation sites to promote formation of cells, bubbles, or voids in the molten resin during the extrusion process. Nucleating agent means a chemical or physical material that provides sites for cells to form in a molten resin mixture. Nucleating agents may be physical agents or chemical agents. Suitable physical nucleating agents have desirable particle size, aspect ratio, and top-cut properties. Examples include, but are not limited to, talc, $CaCO_3$, mica, and mixtures of at least two of the foregoing. The nucleating agent may be blended with the polymer resin formulation that is introduced into the hopper. Alternatively, the nucleating agent may be added to the molten resin mixture in the extruder. When the chemical reaction temperature is reached the nucleating agent acts to enable formation of bubbles that create cells in the molten resin. An illustrative example of a chemical blowing agent is citric acid or a citric acid-based material. After decomposition, the chemical blowing agent forms small gas cells which further serve as nucleation sites for larger cell growth from a physical or other types of blowing agents. One representative example is Hydrocerol™ CF-40E™ (available from Clariant Corporation), which contains citric acid and a crystal nucleating agent. In illustrative embodiments one or more catalysts or other reactants may be added to accelerate or facilitate the formation of cells.

In certain exemplary embodiments, one or more blowing agents may be incorporated. Blowing agent means a physical or a chemical material (or combination of materials) that acts to expand nucleation sites. Nucleating agents and blowing agents may work together. The blowing agent acts to reduce density by forming cells in the molten resin. The blowing agent may be added to the molten resin mixture in the extruder. Representative examples of physical blowing agents include, but are not limited to, carbon dioxide, nitrogen, helium, argon, air, pentane, butane, or other alkane mixtures of the foregoing and the like. In certain exemplary embodiments, a processing aid may be employed that enhances the solubility of the physical blowing agent. Alternatively, the physical blowing agent may be a hydrofluorocarbon, such as 1,1,1,2-tetrafluoroethane, also known as R134a, or other haloalkane refrigerant. Selection of the blowing agent may be made to take environmental impact into consideration.

In exemplary embodiments, physical blowing agents are typically gases that are introduced as liquids under pressure into the molten resin via a port in the extruder as suggested in FIG. 1. As the molten resin passes through the extruder and the die head, the pressure drops causing the physical blowing agent to change phase from a liquid to a gas, thereby creating cells in the extruded resin. Excess gas blows off after extrusion with the remaining gas being trapped in the cells in the extrudate.

Chemical blowing agents are materials that degrade or react to produce a gas. Chemical blowing agents may be endothermic or exothermic. Chemical blowing agents typically degrade at a certain temperature to decompose and release gas. In one aspect the chemical blowing agent may be one or more materials selected from the group consisting of: azodicarbonamide; azodiisobutyro-nitrile; benzenesulfohydrazide; 4,4-oxybenzene sulfonylsemicarbazide; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azobisisobutylonitrile; azocyclohexylnitrile; azodiaminobenzene; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; and p-toluene sulfonyl azide.

In one aspect of the present disclosure, where a chemical blowing agent is used, the chemical blowing agent may be introduced into the resin formulation that is added to the hopper.

In one aspect of the present disclosure, the blowing agent may be a decomposable material that forms a gas upon decomposition. A representative example of such a material is citric acid or a citric-acid based material. In one exemplary aspect of the present disclosure it may be possible to use a mixture of physical and chemical blowing agents.

In one aspect of the present disclosure, at least one slip agent may be incorporated into the resin mixture to aid in increasing production rates. Slip agent (also known as a process aid) is a term used to describe a general class of materials which are added to a resin mixture and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation.

One or more additional components and additives optionally may be incorporated, such as, but not limited to, impact modifiers, colorants (such as, but not limited to, titanium dioxide), and compound regrind.

The polymer resins may be blended with any additional desired components and melted to form a resin formulation mixture.

In addition to surface topography and morphology, another factor that was found to be beneficial to obtain a high quality insulative cup free of creases was the anisotropy of the insulative cellular non-aromatic polymeric strip. Aspect ratio is the ratio of the major axis to the minor axis of the cell. As confirmed by microscopy, in one exemplary embodiment the average cell dimensions in a machine direction 67 (machine or along the web direction) of an extruded strip 82 of insulative cellular non-aromatic polymeric material was about 0.0362 inches (0.92 mm) in width by about 0.0106 inches (0.27 mm) in height. As a result, a machine direction cell size aspect ratio is about 3.5. The average cell dimensions in a cross direction (cross-web or transverse direction) was about 0.0205 inches (0.52 mm) in width and about 0.0106 inches (0.27 mm) in height. As a result, a cross-direction aspect ratio is 1.94. In one exemplary embodiment, it was found that for the strip to withstand compressive force during cup forming, one desirable average aspect ratio of the cells was between about 1.0 and about 3.0. In one exemplary embodiment one desirable average aspect ratio of the cells was between about 1.0 and about 2.0.

The ratio of machine direction to cross direction cell length is used as a measure of anisotropy of the extruded strip. In exemplary embodiments, a strip of insulative cellular non-aromatic polymeric material may be bi-axially oriented, with a coefficient of anisotropy ranging between about 1.5 and about 3. In one exemplary embodiment, the coefficient of anisotropy was about 1.8.

If the circumference of the cup is aligned with machine direction 67 of extruded strip 82 with a cell aspect ratio exceeding about 3.0, deep creases with depth exceeding about 200 microns are typically formed on inside surface of the cup making it unusable. Unexpectedly, it was found, in one exemplary embodiment, that if the circumference of the cup was aligned in the cross direction of extruded strip 82, which can be characterized by cell aspect ratio below about 2.0, no deep creases were formed inside of the cup, indicating that the cross direction of extruded strip 82 was more resistant to compression forces during cup formation.

One possible reason for greater compressibility of an extruded strip with cells having aspect ratio below about 2.0 in the direction of cup circumference, such as in the cross direction, could be due to lower stress concentration for cells with a larger radius. Another possible reason may be that the higher aspect ratio of cells might mean a higher slenderness ratio of the cell wall, which is inversely proportional to buckling strength. Folding of the strip into wrinkles in the compression mode could be approximated as buckling of cell walls. For cell walls with longer length, the slenderness ratio (length to diameter) may be higher. Yet another possible factor in relieving compression stress might be a more favorable polymer chain packing in cell walls in the cross direction allowing polymer chain re-arrangements under compression force. Polymer chains are expected to be preferably oriented and more tightly packed in machine direction 67.

In exemplary embodiments, the combination of alignment of the formed cup circumference along the direction of the extruded strip where cell aspect ratio is below about 2.0. As a result, the surface of extruded strip with crystal domain size below about 100 angstroms facing inside the cup may provide favorable results of achieving a desirable surface topography with imperfections less than about 5 microns deep.

In one aspect of the present disclosure, the polypropylene resin (either the base or the combined base and secondary resin) may have a density in a range of about 0.01 g/cm$^3$ to about 0.19 g/cm$^3$. In one exemplary embodiment, the density may be in a range of about 0.05 g/cm$^3$ to about 0.19 g/cm$^3$. In one exemplary embodiment, the density may be in a range of about 0.1 g/cm$^3$ to about 0.185 g/cm$^3$.

In an alternative exemplary embodiment, instead of polypropylene as the primary polymer, a polylactic acid material may be used, such as, but not limited to, a polylactic acid material derived from a food-based material, for example, corn starch. In one exemplary embodiment, polyethylene may be used as the primary polymer.

In one exemplary aspect of the present disclosure, one formulation for a material useful in the formation of an insulative cellular non-aromatic polymeric material includes the following: at least one primary resin comprising a high melt strength long chain branched polypropylene, at least one secondary resin comprising a high crystalline polypropylene homopolymer or an impact copolymer, at least one nucleating agent, at least one blowing agent, and at least one slip agent. Optionally, a colorant may be incorporated.

The formulation may be introduced into an extruder via a hopper, such as that shown in FIG. 1. During the extrusion process the formulation is heated and melted to form a molten resin mixture. In exemplary embodiments, at least one physical blowing agent is introduced into the molten resin mixture via one or more ports in the extruder. The molten resin mixture and gas is then extruded through a die.

In another exemplary embodiment, the formulation may contain both at least one chemical blowing agent and at least one physical blowing agent.

Cups or other containers or structures may be formed from the sheet according to conventional apparatus and methods.

For the purposes of non-limiting illustration only, formation of a cup from an exemplary embodiment of a material disclosed herein will be described; however, the container may be in any of a variety of possible shapes or structures or for a variety of applications, such as, but not limited to, a conventional beverage cup, storage container, bottle, or the like. For the purpose of nonlimiting illustration only, a liquid beverage will be used as the material which can be contained by the container; however, the container may hold liquids, solids, gels, combinations thereof, or other material.

A material-forming process 100 is shown, for example, in FIG. 1. Material-forming process 100 extrudes a non-aromatic polymeric material into a sheet or strip of insulative cellular non-aromatic polymeric material 82 as suggested in FIG. 1. As an example, material-forming process 100 uses a tandem-extrusion technique in which a first extruder 111 and a second extruder 112 cooperate to extrude strip of insulative cellular non-aromatic polymeric material 82.

As shown in FIG. 1, a formulation 121 of insulative cellular non-aromatic polymeric material 82 is loaded into a hopper 113 coupled to first extruder 111. The formulation 121 may be in pellet, granular flake, powder, or other suitable form. Formulation 121 of insulative cellular non-aromatic polymeric material is moved from hopper 113 by a screw 114 included in first extruder 111. Formulation 121 is transformed into a molten resin 122 in a first extrusion zone of first extruder 111 by application of heat 105 and pressure from screw 114 as suggested in FIG. 1. In exemplary embodiments a physical blowing agent 115 may be introduced and mixed into molten resin 122 after molten resin 122 is established. In exemplary embodiments, as discussed further herein, the physical blowing agent may be a gas introduced as a pressurized liquid via a port 115A and mixed with molten resin 122 to form a molten extrusion resin mixture 123, as shown in FIG. 1.

Extrusion resin mixture 123 is conveyed by screw 114 into a second extrusion zone included in second extruder 112 as shown in FIG. 1. There, extrusion resin mixture 123 is further processed by second extruder 112 before being expelled through an extrusion die 116 coupled to an end of second extruder 112 to form an extrudate 124. As extrusion resin mixture 123 passes through extrusion die 116, gas 115 comes out of solution in extrusion resin mixture 103 and begins to form cells and expand so that extrudate 124 is established. As an exemplary embodiment shown in FIG. 1 the extrudate 124 may be formed by an annular extrusion die 116 to form a tubular extrudate. A slitter 117 then cuts extrudate 124 to establish a sheet or strip 82 of insulative cellular non-aromatic polymeric material as shown in FIG. 1.

Extrudate means the material that exits an extrusion die. The extrudate material may be in a form such as, but not limited to, a sheet, strip, tube, thread, pellet, granule or other structure that is the result of extrusion of a polymer-based formulation as described herein through an extruder die. For the purposes of illustration only, a sheet will be referred to as a representative extrudate structure that may be formed, but is intended to include the structures discussed herein. The extrudate may be further formed into any of a variety of final products, such as, but not limited to, cups, containers, trays, wraps, wound rolls of strips of insulative cellular non-aromatic polymeric material, or the like.

As an example, strip 82 of insulative cellular non-aromatic polymeric material is wound to form a roll of insulative cellular non-aromatic polymeric material and stored for later use. However, it is within the scope of the present disclosure for strip 82 of insulative cellular non-aromatic polymeric material to be used in-line with the cup-forming process. In one illustrative example, strip 82 of insulative cellular non-aromatic polymeric material is laminated with a skin having a film and an ink layer printed on the film to provide high-quality graphics.

Figure 7:
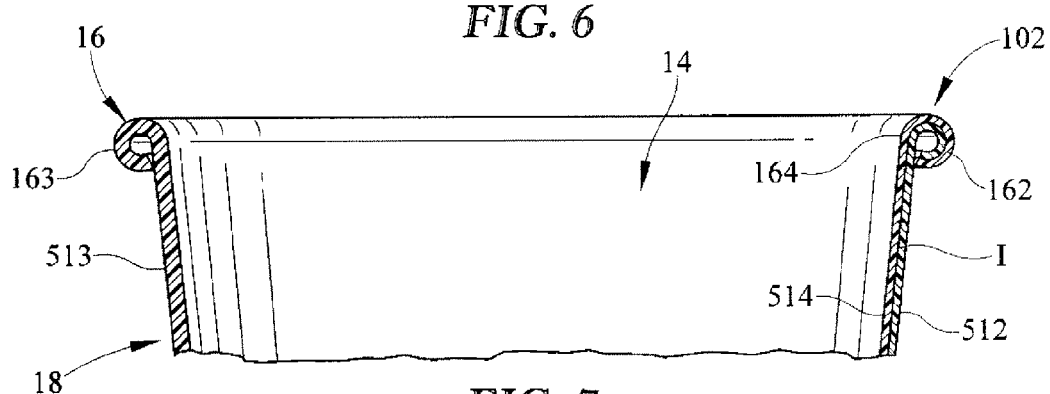

An insulative cup 10 is formed using a strip 82 of insulative cellular non-aromatic polymeric material as shown in FIGS. 2 and 3. Insulative cup 10 includes, for example, a body 11 having a sleeve-shaped side wall 18 and a floor 20 coupled to body 11 to cooperate with the side wall 18 to form an interior region 14 for storing food, liquid, or any suitable product as shown in FIG. 2. Body 11 also includes a rolled brim 16 coupled to an upper end of side wall 18 and a floor mount 17 coupled to a lower end of side wall 18 and to the floor 20 as illustrated in FIGS. 2 and 7.

Body 11 is formed from a strip 82 of insulative cellular non-aromatic polymeric material as disclosed herein. In accordance with the present disclosure, strip 82 of insulative cellular non-aromatic polymeric material is configured through application of pressure and heat (though in exemplary embodiments configuration may be without application of heat) to provide means for enabling localized plastic deformation in at least one selected region of body 11 to provide a plastically deformed first sheet segment having a first density located in a first portion of the selected region of body 11 and a second sheet segment having a second density lower than the first density located in an adjacent second portion of the selected region of body 11 without fracturing the sheet of insulative cellular non-aromatic polymeric material so that a predetermined insulative characteristic is maintained in body 11.

Figure 6:
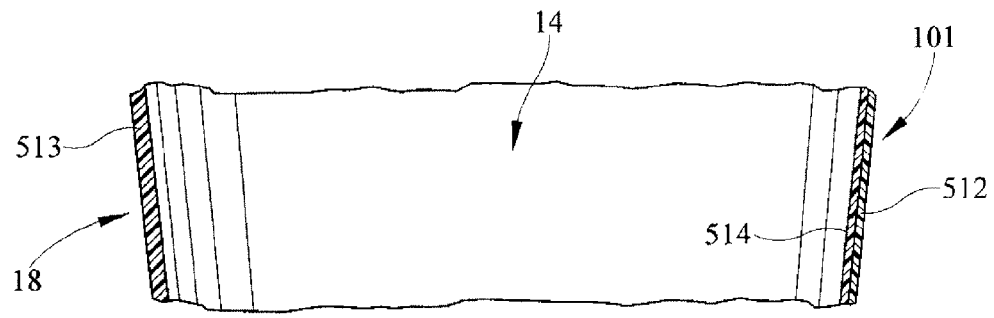
FIGS. 6-9 are a series views showing first, second, third, and fourth regions of the insulative cup of FIG. 2 that each include localized plastic deformation.

A first 101 of the selected regions of body 11 in which localized plastic deformation is enabled by the insulative cellular non-aromatic polymeric material is in sleeve-shaped side wall 18 as suggested in FIGS. 2, 5, and 6. Sleeve-shaped side wall 18 includes an upright inner tab 514, an upright outer tab 512, and an upright fence 513 as suggested in FIGS. 2, 5, and 6. Upright inner tab 514 is arranged to extend upwardly from floor 20 and configured to provide the first sheet segment having the first density in the first 101 of the selected regions of body 11. Upright outer tab 512 is arranged to extend upwardly from floor 20 and to mate with upright inner tab 514 along an interface I therebetween as suggested in FIG. 6. Upright fence 513 is arranged to interconnect upright inner and outer tabs 514, 512 and surround interior region 14. Upright fence 513 is configured to provide the second sheet segment having the second density in the first 101 of the selected regions of body 11 and cooperate with upright inner and outer tabs 514, 512 to form sleeve-shaped side wall 18 as suggested in FIGS. 2-5.

A second 102 of the selected regions of body 11 in which localized plastic deformation is enabled by the sheet of insulative cellular non-aromatic polymeric material is in rolled brim 16 included in body 11 as suggested in FIGS. 2, 4, 5, and 7. Rolled brim 16 is coupled to an upper end of sleeve-shaped side wall 18 to lie in spaced-apart relation to floor 20 and to frame an opening into interior region 14. Rolled brim 16 includes an inner rolled tab 164, an outer rolled tab 162, and a rolled lip 163 as suggested in FIGS. 2, 4, 5, and 7. Inner rolled tab 164 is configured to provide the first sheet segment in the second 102 of the selected regions of body 11. Inner rolled tab 164 is coupled to an upper end of upright outer tab 512 included in sleeve-shaped side wall 18. Outer rolled tab 162 is coupled to an upper end of upright inner tab 514 included in sleeve-shaped side wall 18 and to an outwardly facing exterior surface of inner rolled tab 164. Rolled lip 163 is arranged to interconnect oppositely facing side edges of each of inner and outer rolled tabs 164, 162. Rolled lip 163 is configured to provide the second sheet segment having the second density in the second 102 of the selected region of body 11 and cooperate with inner and outer rolled tabs 164, 162 to form rolled brim 16 as suggested in FIG. 2.

Figure 8:
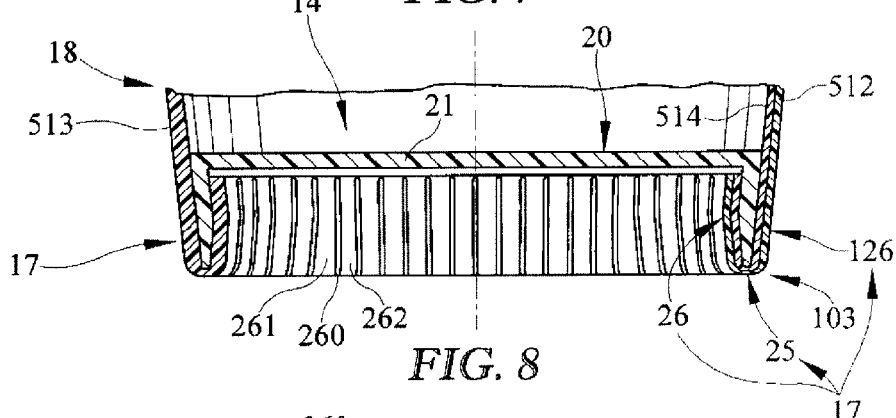

A third 103 of the selected regions of body 11 in which localized plastic deformation is enabled by the sheet of insulative cellular non-aromatic polymeric material is in a floor mount included in body 11 as suggested in FIGS. 2, 5, and 8. Floor mount 17 is coupled to a lower end of sleeve-shaped side wall 18 to lie in spaced-apart relation to rolled brim 16 and to floor 20 to support floor 20 in a stationary position relative to sleeve-shaped side wall 18 to form interior region 14. Floor mount 17 includes a web-support ring 126, a floor-retaining flange 26, and a web 25. Web-support ring 126 is coupled to the lower end of sleeve-shaped side wall 18 and configured to provide the second sheet segment having the second density in the third 103 of the selected regions of body 11. Floor-retaining flange 26 is coupled to floor 20 and arranged to be surrounded by web-support ring 126. Web 25 is arranged to interconnect floor-retaining flange 26 and web-support ring 126. Web 25 is configured to provide the first sheet segment having the first density in the third 103 of the selected regions of body 11.

Figure 9:
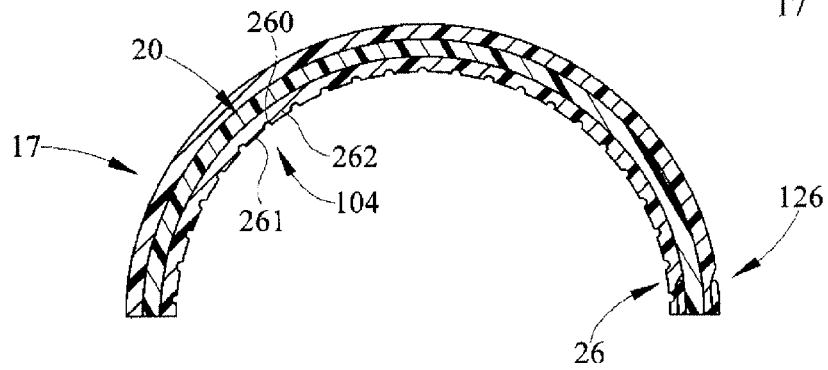
Figure 10:
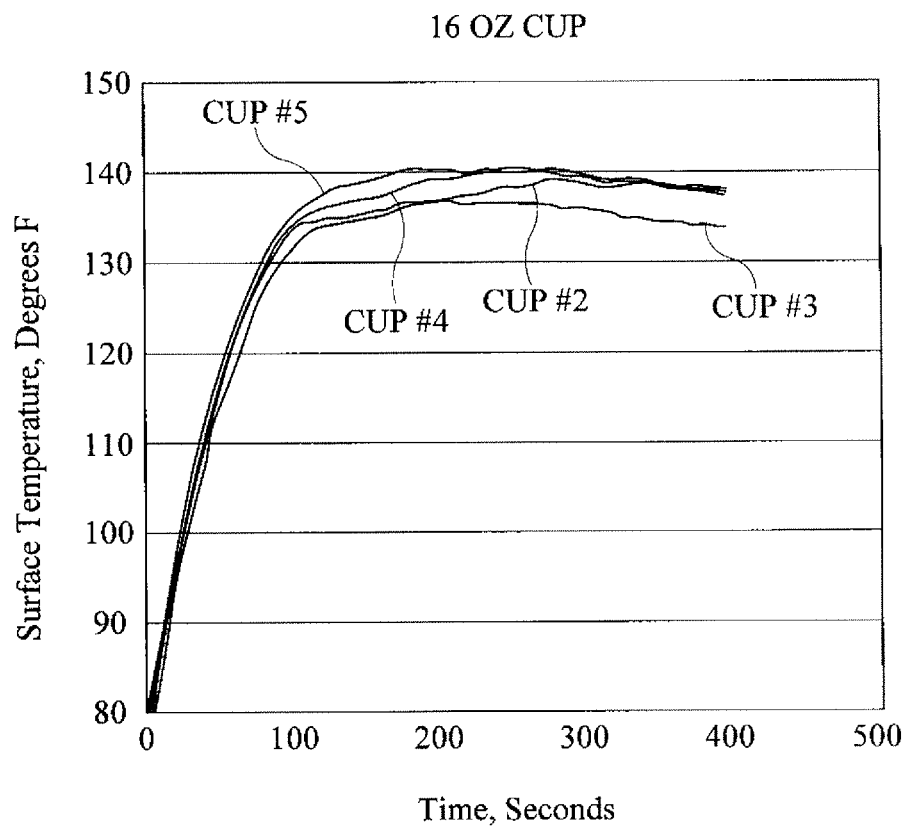
FIG. 10 is a graph showing performance over time of insulative cups in accordance with the present disclosure undergoing temperature testing.

A fourth 104 of the selected regions of body 11 in which localized plastic deformation is enabled by the sheet of insulative cellular non-aromatic polymeric material is in floor-retaining flange of floor mount 17 as suggested in FIGS. 2, 5, and 9. Floor-retaining flange 26 includes an alternating series of upright thick and thin staves arranged in side-to-side relation to extend upwardly from web 25 toward interior region 14 bounded by sleeve-shaped side wall 18 and floor 20. A first 261 of the upright thick staves is configured to include a right side edge extending upwardly from web 25 toward interior region 14. A second 262 of the upright thick staves is configured to include a left side edge arranged to extend upwardly from web 25 toward interior region 14 and lie in spaced-apart confronting relation to right side edge of the first 261 of the upright thick staves. A first 260 of the upright thin staves is arranged to interconnect left side edge of the first 261 of the upright thick staves and right side edge of the second 262 of the upright thick staves and to cooperate with left and right side edges to define therebetween a vertical channel 263 opening inwardly into a lower interior region bounded by floor-retaining flange 26 and a horizontal platform 21 included in floor 20 and located above floor-retaining flange 26. The first 260 of the upright thin staves is configured to provide the first sheet segment in the fourth 104 of the selected regions of body 11. The first 261 of the upright thick staves is configured to provide the second sheet segment in the fourth 104 of the selected regions of the body 11.

The compressibility of the insulative cellular non-aromatic polymeric material used to produce insulative cup 10 allows the insulative cellular non-aromatic polymeric material to be prepared for the mechanical assembly of insulative cup 10, without limitations experienced by other non-aromatic polymeric materials. The cellular nature of the material provides insulative characteristics as discussed below, while susceptibility to plastic deformation permits yielding of the material without fracture. The plastic deformation experienced when the insulative cellular non-aromatic polymeric material is subjected to a pressure load is used to form a permanent set in the insulative cellular non-aromatic polymeric material after the pressure load has been removed. In some locations, the locations of permanent set are positioned to provide controlled gathering of the sheet of insulative cellular non-aromatic polymeric material.

The plastic deformation may also be used to create fold lines in the sheet to control deformation of the sheet when being worked during the assembly process. When deformation is present, the absence of material in the voids formed by the deformation provides relief to allow the material to be easily folded at the locations of deformation.

A potential unexpected feature of the sheet of insulative cellular non-aromatic polymeric material formed as described herein is the high insulation value obtained at a given thickness. See, for example, Examples 1 and 2 below.

A potential feature of a cup formed of insulative cellular non-aromatic polymeric material according to exemplary embodiments of the present disclosure is that the cup has low material loss. Furthermore, the material of the present disclosure may have markedly low off-gassing when subjected to heat from a conventional kitchen-type microwave oven for periods of time up to several minutes.

Another potential feature of a cup formed of the insulative cellular non-aromatic polymeric material according to the present disclosure is that the cup can be placed in and go through a conventional residential or commercial dishwasher cleaning cycle (top rack) without noticeable structural or material breakdown or adverse affect on material properties. This is in comparison to beaded expanded polystyrene cups or containers which can break down under similar cleaning processes. Accordingly, a cup made according to one aspect of the present disclosure can be cleaned and reused.

Another potential feature of an article formed of the insulative cellular non-aromatic polymeric material according to various aspects of the present disclosure is that the article can be recycled. Recyclable means that a material can be added (such as regrind) back into an extrusion or other formation process without segregation of components of the material, i.e., an article formed of the material does not have to be manipulated to remove one or more materials or components prior to re-entering the extrusion process. For example, a cup having a printed film layer laminated to the exterior of the cup may be recyclable if one does not need to separate out the film layer prior to the cup being ground into particles. In contrast, a paper-wrapped expanded polystyrene cup may not be recyclable because the polystyrene material could not practicably be used as material in forming an expanded polystyrene cup, even though the cup material may possibly be formed into another product. As a further example, a cup formed from a non-expanded polystyrene material having a layer of non-styrene printed film adhered thereto may be considered non-recyclable because it would require the segregation of the polystyrene cup material from the non-styrene film layer, which would not be desirable to introduce as part of the regrind into the extrusion process.

Recyclability of articles formed from the insulative cellular non-aromatic polymeric material of the present disclosure minimizes the amount of disposable waste created. In comparison, beaded expanded polystyrene cups break up into beads and thus ordinarily cannot easily be reused in a manufacturing process with the same material from which the article was formed. And, paper cups that typically have an extrusion coated plastic layer or a plastic lamination for liquid resistance ordinarily cannot be recycled because the different materials (paper, adhesive, film, plastic) normally cannot be practicably separated in commercial recycling operations.

A potential feature of a cup or other article formed of material according to one aspect (a non-laminate process) of the present disclosure is that the outside (or inside or both) wall surface of the insulative cellular non-aromatic polypropylene sheet (prior to being formed into a cup, or during cup formation, depending on the manufacturing process employed) can accept printing of high-resolution graphics. Conventional beaded expanded polystyrene cups have a surface which typically is not smooth enough to accept printing other than low-resolution graphics. Similarly, known uncoated paper cups also typically do not have a smooth enough surface for such high-resolution graphics. Paper cups can be coated to have the desired surface finish and can achieve high resolution. Paper has difficulty reaching insulation levels and requires a designed air gap incorporated into or associated with the cup to achieve insulation, such as a sleeve slid onto and over a portion of the cup. Accordingly, solutions have been to use low-resolution printing, laminate to the outside wall a film which has been printed, or to have a printed sleeve (either bonded or removable) inserted over the outside wall or coat the paper to accept high resolution graphics.

A potential feature of a cup formed of the insulative cellular non-aromatic polymeric material according to one aspect of the present disclosure is that it possesses unexpected strength as measured by rigidity. Rigidity is a measurement done at room temperature and at an elevated temperature (e.g., by filling the cup with a hot liquid) and measuring the rigidity of the material. The strength of the cup material is important to reduce the potential for the cup being deformed by a user and the lid popping off or the lid or sidewall seal leaking.

A potential feature of a cup formed of the insulative cellular non-aromatic polymeric material according to the present disclosure is that the sleeve is resistant to puncture, such as by a straw, fork, spoon, finger nail, or the like, as measured by standard impact testing, as described hereinbelow. Test materials demonstrated substantially higher impact resistance when compared to a beaded expanded polystyrene cup. Accordingly, a cup formed as described herein can reduce the likelihood of puncture and leakage of hot liquid onto a user.

A feature of a cup with a compressed brim and seam formed of the material according to one aspect as described herein is that a greater number of such cups can be nested in a given sleeve length because the seam is thinner and the side wall angle can be minimized (i.e., more approaching 90° with respect to the cup bottom) while providing a sufficient air gap to permit easy de-nesting. Conventionally seam-formed cups having a seam substantially thicker than the side wall requires a greater side wall angle (and air gap) to allow for de-nesting, resulting in fewer cups being able to be nested in a given sleeve length.

A feature of a cup formed of the material according to one aspect of the present disclosure is that the brim may have a cross-section profile of less than about 0.170 inches (4.318 mm) which may be due to localized cell deformation and compression. Such a small profile is more aesthetically pleasing than a larger profile.

A feature of a cup formed of the material according to one aspect of the present disclosure is that the rolled brim diameter can be the same for cups of different volumes, enabling one lid size to be used for different cup sizes, assuming the cup rims outside diameters are the same. As a result, the number of different size lids in inventory and at the point of use may be reduced.

The material formulation may have properties that allow the sheet to be compressed without fracturing.

The insulative cellular non-aromatic polymeric material of the present disclosure may be formed into a strip which can be wrapped around other structures. For example, a strip of the material according to one aspect of the present disclosure that can be used as a wrapping material may be formed and wrapped around a pipe, conduit, or other structure to provide improved insulation. The sheet or strip may have a layer of adhesive, such as a pressure sensitive adhesive, applied to one or both faces. The strip may be wound onto a roll. Optionally, the strip may have a release liner associated therewith to make unwinding the strip from the roll easier. The polymer formulation may be adapted to provide the requisite flexibility to form a wrap or windable strip, for example, by using one or more polypropylene or other polyolefin materials that have sufficient flexibility to enable the extruded sheet to be flexible enough to be wound onto a roll. The insulative cellular non-aromatic polymeric material may be formed into a sleeve that can be inserted over a cup to provide additional insulation.

In exemplary embodiments sheets formed from the insulative cellular non-aromatic polymeric material of the present disclosure may be cut at the die or be flaked and used as a bulk insulator.

The formulation and insulative cellular non-aromatic polymeric material of the present disclosure satisfies a long-felt need for a material that can be formed into an article, such as a cup, that includes many if not all of the features of insulative performance, ready for recyclability, puncture resistance, frangibility resistance, microwavability and other features as discussed herein. Others have failed to provide a material that achieves combinations of these features as reflected in the appended claims. This failure is a result of the features being associated with competitive design choices. As an example, others have created materials and structures therefrom that based on design choices are insulated but suffer from poor puncture resistance, inability to effectively be recyclable, and lack microwavability. In comparison, the formulations and materials disclosed herein overcome the failures of others by using an insulative cellular non-aromatic polymeric material. Reference is hereby made to U.S. application Ser. No. 13/491,007 filed Jun. 7, 2012 and entitled INSULATED CONTAINER for disclosure relating to articles, such as cups, formed from such insulative cellular non-aromatic polymeric materials, which application is hereby incorporated in its entirety herein.

EXAMPLES

The following examples are set forth for purposes of illustration only. Parts and percentages appearing in such examples are by weight unless otherwise stipulated. All ASTM, ISO and other standard test method cited or referred to in this disclosure are incorporated by reference in their entirety.

Example 1

Formulation and Extrusion

DAPLOY™ WB140 polypropylene homopolymer (available from Borealis A/S) was used as the polypropylene base resin. F020HC, available from Braskem, a polypropylene homopolymer resin, was used as the secondary resin. The two resins were blended with: Hydrocerol™ CF-40E™ as a primary nucleation agent, talc as a secondary nucleation agent, $CO_2$ as a blowing agent, a slip agent, and titanium dioxide as a colorant. Percentages were:

79.9% Primary resin: high melt strength polypropylene Borealis WB140 HMS 15% Secondary resin: F020HC (Braskem)

0.1% Primary nucleating agent: Clariant Hyrocerol CF-40E™

2% Secondary nucleating agent: Talc

1% Colorant: $TiO_2$ PE (alternatively, PP can be used)

2% Slip agent: Ampacet™ 102823 LLDPE (linear low-density polyethylene), available from Ampacet Corporation The formulation was added to an extruder hopper. The extruder heated the formulation to form a molten resin mixture. To this mixture was added 1.1 lbs/hr $CO_2$ 0.7 lbs/hr R134a The carbon dioxide with R134a was injected into the resin blend to expand the resin and reduce density. The mixture thus formed was extruded through a die head into a sheet. The sheet was then cut and formed into a cup.

Example 1

Test Results

The test results of the material formed according to Example 1 showed the material had a density of about 0.1902 g/cm$^3$ and a nominal sheet gauge of about 0.089 inches (2.2606 mm).

Microwavability

Containers produced using this material filled with 12 ounces of room temperature water were heated in a FISO Microwave Station (1200 Watts) microwave oven for 2.5 min without burning or scorching or other visible effect on the cup. In comparison, paper cups heated in the same microwave oven scorched or burned in less than 90 seconds.

Rigidity

Test Method

Samples were at 73° F. (22.8° C.) and 50% relative humidity. The Cup Stiffness/Rigidity test was conducted with a horizontal force gauge containing a load cell to measure the resisting force of the cup when exposed to the following test conditions: (a) The test location on the cup was ⅓ down from the rim of the cup; (b) testing travel distance is 0.25 inches (6.35 mm); and (c) testing travel time was 10 seconds.

Test Results

With an average wall thickness of about 0.064 inches (1.6256 mm), average density of about 0.1776 g/cm$^3$, and average cup weight of about 9.86 g, the rigidity of the material are shown below in Tables 1-2.

TABLE 1

Rigidity Test Results unlidded/unfilled

Rigidities (kg-F)

| Cup # | Seam | 90° from Seam | Average |
|---|---|---|---|
| 1 | 0.64 | 0.654 | 0.647 |
| 2 | 0.646 | 0.672 | 0.659 |
| 3 | 0.632 | 0.642 | 0.637 |
| 4 | 0.562 | 0.608 | 0.585 |
| 5 | 0.652 | 0.596 | 0.624 |
|   |       |       | 0.630 |
| STD DEV |   |   | 0.028 |
| 3 sigma |   |   | 0.085 |
| High Range |   |   | 0.716 |
| Low Range |   |   | 0.545 | lidded/unfilled

Rigidities (kg-F)

| Cup # | Seam | 90° from Seam | Average |
|---|---|---|---|
| 6 | 0.89 | 0.83 | 0.860 |
| 7 | 0.954 | 0.904 | 0.929 |
| 8 | 0.846 | 0.808 | 0.827 |
| 9 | 0.732 | 0.826 | 0.779 |
| 10 | 0.87 | 0.792 | 0.831 |
|    |      |       | 0.845 |
| STD DEV |   |   | 0.055 |
| 3 sigma |   |   | 0.165 |
| High Range |   |   | 1.011 |
| Low Range |   |   | 0.680 | unlidded/filled 200° F.

Rigidities (kg-F)

| Cup # | Seam | 90° from Seam | Average |
|---|---|---|---|
| 11 | 0.274 | 0.290 | 0.282 |
| 12 | 0.278 | 0.326 | 0.302 |
| 13 | 0.264 | 0.274 | 0.269 |
| 14 | 0.300 | 0.270 | 0.285 |
| 15 | 0.252 | 0.280 | 0.266 |
|    |       |       | 0.281 |
| STD DEV |   |   | 0.014 |
| 3 sigma |   |   | 0.043 |

TABLE 1-continued

Rigidity Test Results

|   |   | High Range | 0.324 |
|---|---|---|---|
|   |   | Low Range | 0.238 | lidded/filled 200° F.

Rigidities (kg-F)

| Cup # | Seam | 90° from Seam | Average |
|---|---|---|---|
| 16 | 0.346 | 0.354 | 0.350 |
| 17 | 0.386 | 0.422 | 0.404 |
| 18 | 0.358 | 0.364 | 0.361 |
| 19 | 0.338 | 0.374 | 0.356 |
| 20 | 0.304 | 0.272 | 0.288 |
|    |       |       | 0.352 |
| STD DEV |   |   | 0.042 |
| 3 sigma |   |   | 0.125 |
| High Range |   |   | 0.476 |
| Low Range |   |   | 0.227 | unlidded/filled ice water

Rigidities (kg-F)

| Cup # | Seam | 90° from Seam | Average |
|---|---|---|---|
| 21 | 0.796 | 0.730 | 0.763 |
| 22 | 0.818 | 0.826 | 0.822 |
| 23 | 0.894 | 0.760 | 0.827 |
| 24 | 0.776 | 0.844 | 0.810 |
| 25 | 0.804 | 0.714 | 0.759 |
|    |       |       | 0.796 |
| STD DEV |   |   | 0.033 |
| 3 sigma |   |   | 0.098 |
| High Range |   |   | 0.894 |
| Low Range |   |   | 0.698 | lidded/filled ice water

Rigidities (kg-F)

| Cup # | Seam | 90° from Seam | Average |
|---|---|---|---|
| 26 | 1.044 | 0.892 | 0.968 |
| 27 | 1.146 | 1.018 | 1.082 |
| 28 | 0.988 | 1.054 | 1.021 |
| 29 | 1.012 | 1.106 | 1.059 |
| 30 | 0.826 | 1.058 | 0.942 |
|    |       |       | 1.014 |
| STD DEV |   |   | 0.059 |
| 3 sigma |   |   | 0.177 |
| High Range |   |   | 1.192 |
| Low Range |   |   | 0.837 |

TABLE 2

Summary of Rigidity Test Results

| | Unfilled Kg-F (kilograms-force) | | Hot Fill 200° F. Kg-F | | Ice Water Fill 35° F. Kg-F | | Wall Thickness | Density |
|---|---|---|---|---|---|---|---|---|
| | Unlidded | Lidded | Unlidded | Lidded | Unlidded | Lidded | Inches | g/cc |
| Test material | 0.630 | 0.845 | 0.281 | 0.352 | 0.796 | 1.014 | 0.064 | 0.1776 |

Insulation
  Test Method
  A typical industrial cup insulation test method as follows was used:

Attach the (cup exterior) surface temperature thermocouple to cup with glue.
  Tape attached thermocouple to cup with cellophane tape so that the thermocouple is in the middle of the cup opposite the seam.
  Heat water or other aqueous liquid to near boiling, such as in a microwave.
  Continually stir the hot liquid with a bulb thermometer while observing the liquid temperature.
  Record thermocouple temperature.
  When the liquid gets to 200° F. pour into cup to near full.
  Place lid on cup.
  Record surface temperature for a minimum of 5 minutes.
  Material thickness was about 0.089 inches (2.2606 mm).
  The density was about 0.1902 g/cm$^3$.
  Test Results
  A cup formed from the formulation noted above was used having a density of about 0.190 g/cm$^3$ and a wall thickness of about 0.089 inches. A hot liquid at 200° F. (93.3° C.) was placed in the cup.

Test Results
  The temperature measured on the outside wall of the cup was about 140.5° F. (60.3° C.) resulting in drop of about 59.5° F. (33° C.). The maximum temperature over a five-minute period was observed to peak at about 140.5° F. (60.3° C.). The lower the temperature, the better the insulation property of the cup material as the material reduces the heat transferring from the liquid to the cup material exterior.

Frangibility
  Frangibility can be defined as resistance to tear or punctures causing fragmentation.
  Test Method
  The Elmendorf test method described in ASTM D1922-93 was used. The radius of tear was 1.7 inches (43.18 mm).
  Test Results
  The test results are shown in Tables 3-4 below. The material as formed in one exemplary embodiment of the present disclosure provides superior resistance to tear forces when compared to EPS.

TABLE 4

Summary of Test Results

| Tear Strength | Sample ID → | Test material cup (mean) |
|---|---|---|
| Elmendorf Tear machine direction (MD) Arm | g (gram) | 800 |
| Elmendorf Tear MD | gf (gram force) | 282 |
| Elmendorf Tear transverse direction (TD) Arm | g | 800 |
| Elmendorf Tear TD | gf | 212 |

| Tear Strength | Expanded polystyrene (mean) |
|---|---|
| Elmendorf Tear Arm | 800 |
| Elmendorf Tear | 112 |

Note that there was no data obtained for the transverse direction test for expanded polystyrene because expanded polystyrene does not have a material orientation, i.e., a machine or transverse direction, due to the manufacturing process. The range (calculated as: lower range=mean−(3× std dev); upper range=mean+(3× std dev)) for the tested material of the present disclosure was about 213 grams-force to about 351 grams-force in the machine direction and about 143 grams-force to about 281 grams-force in the transverse direction. In comparison, the range of the expanded polystyrene material tested was about 103 grams-force to about 121 grams-force.

Puncture Resistance
  Test Method
  Determine the force and travel needed to puncture cup sidewall and bottom. An Instron instrument is used in compression mode set to 10 inches (254 mm) per minute travel speed. The cup puncture test fixture on base of Instron is used. This fixture allows the cup to fit over a shape that fits inside the cup with a top surface that is perpendicular to the travel of the Instron tester. The one inch diameter hole of the fixture should be positioned up. The portion of the Instron that moves should be fitted with a 0.300 inch (7.62 mm) diameter punch. The punch with the hole is aligned in the test fixture. The cup is placed over the fixture and the force and travel needed to puncture the cup sidewall is recorded. The sidewall puncture test is repeated in three evenly spaced locations while not puncture testing on the seam of the cup. The bottom of the cup is tested. This should be done in the same manner as the sidewall test except no fixture is used. The cup is just placed upside down on the base of the Instron while bringing the punch down on the center of the cup bottom.

TABLE 3

| | Test Results | | | | | | | | | | | | |
|---|---|---|---|---|---|---|---|---|---|---|---|---|---|
| | Machine Direction (gram force) | | | | | | | Transverse Direction (gram force) | | | | | |
| Tag | Test 1 | Test 2 | Test 3 | Test 4 | Test 5 | mean | std dev | Test 1 | Test 2 | Test 3 | Test 4 | Test 5 | mean | std dev. |
| Test Material | 288 | 262 | 288 | 258 | 315 | 282 | 23 | 232 | 213 | 178 | 205 | 232 | 212 | 23 |
| EPS | 108 | 114 | 112 | 116 | 110 | 112 | 3 | * | | | | | | |

Test Results

Results of the typical sidewall puncture and the bottom puncture are shown in Table 5 below.

TABLE 5

Puncture Test Results

| Cavity # | Max Load (lbf) | Ext. @ Max Load (in) |
|---|---|---|
| Expanded polystyrene | 3.79 | 0.300 |
| tested insulative cellular non-aromatic polymeric material (No Rim) | 22.18 | 0.292 |

Slow Puncture Resistance—Straw

Test Method

The material as formed in one exemplary embodiment of the present disclosure provides superior resistance to punctures when compared to expanded polystyrene using the Slow Puncture Resistance Test Method as described in ASTM D-3763-86. The test results are shown in Tables 6-9 below.

Test Results

TABLE 6

Tested Material

| Specimen # | Peak Load g(f) | Elongation At Break (mm) |
|---|---|---|
| 1 | 13876.49 | — |
| 2 | 13684.33 | — |
| 3 | 15121.53 | — |
| 4 | 15268.95 | 17 |
| 5 | 14970.47 | 20 |
| 6 | 13049.71 | — |
| 7 | 15648.44 | 17 |
| 8 | 15352.38 | 23 |
| 9 | 18271.37 | — |

TABLE 6-continued

Tested Material

| Specimen # | Peak Load g(f) | Elongation At Break (mm) |
|---|---|---|
| 10 | 16859.29 | — |
| Mean | 15210.30 | 19 |
| Std. Dev. | 1532.83 | 3 |

TABLE 7

Comparison: Expanded Polystyrene

| Specimen # | Peak Load g(f) | Elongation At Break (mm) |
|---|---|---|
| 1 | 2936.73 | — |
| 2 | 2870.07 | 10 |
| 3 | 2572.62 | — |
| 4 | 2632.44 | — |
| 5 | 2809.70 | — |
| 6 | 2842.93 | — |
| 7 | 2654.55 | — |
| 8 | 2872.96 | — |
| 9 | 2487.63 | — |
| 10 | 2866.53 | — |
| 11 | 2803.25 | — |
| 12 | 2775.22 | — |
| 13 | 2834.28 | — |
| 14 | 2569.97 | — |
| Mean | 2752.06 | 10 |
| Std. Dev. | 140.42 | — |

TABLE 8

Paper Wrapped Expanded Polystyrene

| Specimen # | Peak Load g(f) | Elongation At Break (mm) |
|---|---|---|
| 1 | 7930.61 | — |
| 2 | 10044.30 | — |
| 3 | 9849.01 | — |
| 4 | 8711.44 | — |
| 5 | 9596.79 | — |
| 6 | 9302.99 | — |
| 7 | 10252.27 | — |
| 8 | 7785.64 | — |
| 9 | 8437.28 | — |
| 10 | 6751.98 | — |
| 11 | 9993.19 | — |
| Mean | 8968.68 | — |
| Std. Dev. | 1134.68 | — |

TABLE 9

Summary of Slow Puncture-Straw Test Results

| Sample ID → | Tested insulative cellular non-aromatic polymeric material cup (mean) grams-force (gf) | Expanded polystyrene (mean) grams-force (gf) | Paper wrapped expanded polystyrene (mean) grams-force (gf) |
|---|---|---|---|
| Average gf: | 15210 | 2752 | 8969 |

Example 2

Formulation and Extrusion

The following formulation was used:
81.70% Borealis WB140HMS primary polypropylene
0.25% Amco A18035 PPRO talc filled concentrate
2% Ampacet 102823 Process Aid PE MB linear low density polyethylene slip agent
0.05% Hydrocerol CF-40E chemical foaming agent
1% Colortech 11933-19 colorant
15% Braskem F020HC high crystallinity homopolymer polypropylene
3.4 lbs/hour of $CO_2$ was introduced into the molten resin.
Density of the strip formed ranged from about 0.155 g/cm$^3$ to about 0.182 g/cm$^3$.

The formulation was added to an extruder hopper. The extruder heated the formulation to form a molten resin mixture. To this mixture was added the $CO_2$ to expand the resin and reduce density. The mixture thus formed was extruded through a die head into a strip 82. The strip was then cut and formed into insulative cup 10.

Example 2

Test Results

In exemplary embodiments, a tube of extruded insulative cellular non-aromatic polymeric material has two surfaces that are formed under different cooling conditions when the material is extruded. One surface, which will be further referenced as the outside surface of extruded tube, is in contact with air, and does not have physical barriers restricting the expansion. The outside surface of extruded tube surface is cooled by blowing compressed air at cooling rate equal or higher than 12° F. per second. Surface on the opposite side will be referenced as inside of extruded tube. The inside of extruded tube surface is formed when the extruded tube is drawn in the web or machine direction on the metal cooling surface of the torpedo mandrel that is physically restricting the inside of extruded tube and is cooled by combination of water and compressed air at a cooling rate below 10° F. per second. In exemplary embodiments, the cooling water temperature is about 135° F. (57.22° C.). In exemplary embodiments, the cooling air temperature is about 85° F. (29.44° C.). As a result of different cooling mechanisms the outside surface of extruded tube and inside of extruded tube surfaces have different surface characteristics. It is known that the cooling rate and method affects the crystallization process of polypropylene altering its morphology (size of crystal domains) and topography (surface profile and smoothness).

An unexpected feature of exemplary embodiments of an extruded sheet as described herein is in the ability of the sheet to form a noticeably smooth, crease and wrinkle free surface, when curved to form a round article, such as cup. The surface is smooth and wrinkle free even inside the cup, where compression forces typically cause material to crush crease easily, especially for low density material with large cell size. In exemplary embodiments, the smoothness of the surface of an extruded sheet of insulative cellular non-aromatic polymeric material as detected by microscopy is such that the depth of the indentations (creases or wrinkles) naturally occurring in the outside and inside of the cup surface when it is subject to extension and compression forces during cup formation may be less than about 100 microns. In one exemplary embodiment, the smoothness may be less than about 50 microns. In one exemplary embodiment, the smoothness may be about 5 microns or less. At about 10 microns depth and less, the micro-wrinkles on cup surface are ordinarily not visible to the naked eye.

In one exemplary embodiment, an insulative cup formed from a sheet comprising a skin and a strip of insulative cellular non-aromatic polymeric material had typical creases (deep wrinkle) about 200 microns deep extending from the top to bottom of the cup. In one exemplary embodiment, an insulative cup formed from a sheet comprising a strip of insulative cellular non-aromatic polymeric material only (without a skin) had typical creases about 200 microns deep extending from top to bottom of the cup. Such creases with depths from about 100 microns to about 500 microns are typically formed when inside of extruded tube is facing inside of the cup in a compression mode. Creases and deep wrinkles may present a problem of unsatisfactory surface quality making final cups unusable or undesirable. Creases may form in instances where sheets include a skin or exclude a skin.

In exemplary embodiments, the insulative cellular non-aromatic polymeric material may be extruded as strip. However microscopy images show that two distinct layers exist within the extruded strip, namely, dull outside extruded tube layer and shiny inside extruded tube layer. The difference between the two layers is in reflectance of the surface due to the difference in crystal domain size. If a black marker is used to color the surface examined by microscope, reflectance is eliminated and the difference between the two surfaces may be minimal or undetectable.

In one exemplary embodiment, a sample strip was prepared without any skin. Black marker was used to eliminate any difference in reflectance between the layers. Images showed that the cell size and cell distribution was the same throughout the strip thickness. A crease of about 200 microns deep was seen as a fold in the surface where the cell wall collapsed under the compression forces.

Differential scanning calorimetry analysis conducted on a TA Instruments DSC 2910 in nitrogen atmosphere showed that with an increase in cooling rate, the crystallization temperature and crystallinity degree decreased for the polymer matrix material of the strip, as shown below in Table 10.

TABLE 10

| Crystallization of polymer matrix | | | | | |
|---|---|---|---|---|---|
| Crystallization temp, in ° C. | | | Crystallinity degree, in % | | |
| Slow cooling 5° C./min | 10° C./ min | Fast cooling 15° C./min | Slow cooling 5° C./min | 10° C./ min | Fast cooling 15° C./min |
| 135.3 | 131.5 | 129.0 | 49.2 | 48.2 | 47.4 |
| Melting (2$^{nd}$ heat) of polymer matrix (heating rate 10° C./min) after crystallization | | | | | |
| Melting temp, ° C. | | | Crystallinity degree, % | | |
| Slow cooling 5° C./min | 10° C./ min | Fast cooling 15° C./min | Slow cooling 5° C./min | 10° C./ min | Fast cooling 15° C./min |
| 162.3 | 162.1 | 161.8 | 48.7 | 47.2 | 46.9 |

Differential scanning calorimetry data demonstrates the dependence of crystallization and subsequent 2$^{nd}$ heat melting temperature and percent crystallinity on the rate of cooling during crystallization. Exemplary embodiments of a strip of insulative cellular non-aromatic polymeric material may have the melting temperature between about 160° C. (320° F.) and about 172° C. (341.6° F.), crystallization temperature between about 108° C. (226.4° F.) and about 135° C. (275° F.), and percent crystallinity between about 42% and about 62%.

In exemplary embodiments the extruded sheet as determined by differential scanning calorimetry at 10° C. per minute heating and cooling rate had a melting temperature of about 162° C. (323.6° F.), crystallization temperature of about 131° C. (267.8° F.) and crystallinity degree of about 46%.

It was found unexpectedly that the outside extrusion tube surface works favorably in a compression mode without causing appreciable creasing and therefore a cup (or other structure) may advantageously be made with the outside extrusion tube surface facing inside of the insulative cup. The difference in the resistance of the inside extrusion tube layer and outside extrusion tube layer to compression force may be due to difference in the morphology of the layers because they were crystallized at different cooling rates.

In exemplary embodiments of formation of an extruded sheet, the inside extrusion tube surface may be cooled by combination of water cooling and compressed air. The outside extrusion tube surface may be cooled by compressed air by using torpedo with circulating water and air outlet. Faster cooling rates may result in the formation of smaller size crystals. Typically, the higher cooling rate, the greater the relative amount of smaller crystals that is formed. X-Ray diffraction analysis of an exemplary extruded sheet of insulative cellular non-aromatic polymeric material was conducted on Panalytical X'pert MPD Pro diffractometer using Cu radiation at 45 KV/40 mA. It was confirmed that the outside extrusion tube surface had a crystal domain size of about 99 angstrom, while the inside extrustion tube surface had a crystal domain size of about 114 angstrom. In exemplary embodiments, an extruded strip of insulative cellular non-aromatic polymeric material may have a crystal domain size below about 200 angstroms. In exemplary embodiments, an extruded strip of insulative cellular non-aromatic polymeric material may have a crystal domain size preferably below about 115 angstroms. In exemplary embodiments, an extruded strip of insulative cellular non-aromatic polymeric material may have a crystal domain size below about 100 angstroms.

Rigidity

Test Method

The test method is the same as described for rigidity testing in Example 1.

Test Results

The rigidity test results are shown in Table 11 below.

TABLE 11

| | unlidded/filled 200° F. Rigidities (kg's) | | | lidded/filled 200° F. Rigidities (kg's) | | | | |
|---|---|---|---|---|---|---|---|---|
| Sample# | Seam | 90° from Seam | Average | Seam | 90° from Seam | Average | Gram Weights | Wall Thickness |
| B1 | 0.354 | 0.380 | 0.367 | 0.470 | 0.528 | 0.499 | 12.6 | 0.0744 |
| B2 | 0.426 | 0.464 | 0.445 | 0.598 | 0.610 | 0.604 | 13.0 | |
| B3 | 0.526 | 0.494 | 0.510 | 0.628 | 0.618 | 0.623 | 12.4 | |
| B4 | 0.592 | 0.566 | 0.579 | 0.740 | 0.746 | 0.743 | 13.2 | |
| | | | 0.475 | | | 0.617 | 12.80 | |
| | | | | | | | | Density 0.1817 |

Insulation

Test Method—Wall Temperature

An insulative cup formed from the formulation noted above was used having a density of about 0.18 g/cm$^3$ and a wall thickness of about 0.074 inches (1.8796 mm). A hot liquid at 200° F. (93.3° C.) was placed in the cup.

Test Results

The temperature measured on the outside wall of the cup was about 151° F. (66.1° C.) with a drop of about 49.0° F. (27.2° C.). The maximum temperature over a five-minute period was observed to peak at about 151° F. (66.1° C.).

Insulation testing in the form of thermal conductivity was done.

Test Method—Thermal Conductivity

This test measures bulk thermal conductivity (W/m-K), measured at ambient temperature and at 93° C. (199.4° F.). A TherinTest TPS 2500 S Thermal Constants Analyzer instrument was used, employing the test method of ISO/DIS 22007-2.2 and using the Low Density/High Insulating option. The TPS sensor #5501 0.2521 inch radius (6.403 mm radius) with Kapton® insulation was used for all measurements. A 20 second test was done, using 0.02 Watts power. Data using points 100-200 were reported.

Test Results

The test results are shown in Table 12 below.

TABLE 12

Mean Thermal Conductivity Results

| Temp. (° C.) | Mean Thermal Conductivity (W/m-K) | Standard Deviation (W/m-K) |
|---|---|---|
| 21 | 0.05792 | 0.00005 |
| 93 | 0.06680 | 0.00025 |

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment, and systems. These and other components are disclosed herein, and it is understood that when combinations, subsets, interactions, groups, etc. of these components are disclosed while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only.

It should further be noted that any publications and brochures referred to herein are incorporated by reference in their entirety.

The invention claimed is:

1. A formulation for forming an insulative cellular non-aromatic polymeric structure, the formulation comprising
a first polymer material comprising at least one high melt strength polypropylene having a melt strength of at least 36 and a melting temperature of at least 163° C. (325.4° F.),
a second polymer material comprising at least one polymer selected from the group consisting of polypropylene, polyethylene, and mixtures thereof,
at least one nucleating agent selected from the group consisting of chemical nucleating agents, physical nucleating agents, and combinations and mixtures thereof, and
at least one blowing agent.

2. The formulation of claim 1, wherein the second polymer material is a homopolymer.

3. The formulation of claim 2, wherein the first polymer material is a homopolymer.

4. The formulation of claim 3, wherein the insulative cellular non-aromatic polymeric structure has a density in a range of about 0.01 g/cm³ to about 0.19 g/cm³.

5. The formulation of claim 4, further comprising at least one slip agent.

6. The formulation of claim 4, wherein the insulative cellular non-aromatic polymeric structure has a density in a range of about 0.05 g/cm³ to about 0.19 g/cm³.

7. The formulation of claim 1, wherein the structure has cells having an average cell aspect ratio in at least one direction in a range of about 1.0 to about 3.0.

8. The formulation of claim 7, wherein the structure has cells having an average cell aspect ratio in at least one direction of about 2.0.

9. The formulation of claim 8, wherein the insulative cellular non-aromatic polymeric structure has a density in a range of about 0.05 g/cm³ to about 0.19 g/cm³.

10. The formulation of claim 9, further comprising at least one slip agent.

11. The formulation of claim 1, wherein the first polymer material is a homopolymer.

12. The formulation of claim 11, wherein the structure has cells having an average cell aspect ratio in at least one direction of about 2.0.

13. The formulation of claim 12, wherein the insulative cellular non-aromatic polymeric structure has a density in a range of about 0.05 g/cm³ to about 0.19 g/cm³.

14. The formulation of claim 13, further comprising at least one slip agent.

15. A formulation for forming an insulative cellular non-aromatic polymeric structure, the formulation comprising
a first polymer material comprising at least one high melt strength polypropylene having a melt strength of at least 36 and a melting temperature of at least 163° C. (325.4° F.),
a second polymer material comprising at least one polypropylene selected from the group consisting of impact copolymers and high crystalline homopolymers,
at least one nucleating agent selected from the group consisting of chemical nucleating agents, physical nucleating agents, and combinations thereof, and
at least one blowing agent comprising at least one composition selected from the group consisting of chemical blowing agents, inert gases, and combinations thereof.

16. The formulation of claim 15, wherein the structure has cells having an average cell aspect ratio in at least one direction of about 2.0.

17. The formulation of claim 16, wherein the insulative cellular non-aromatic polymeric structure has a density in a range of about 0.05 g/cm³ to about 0.19 g/cm³.

18. The formulation of claim 17, further comprising a slip agent.

19. The formulation of claim 15, wherein the first polymer material is a homopolymer.

20. The formulation of claim 19, further comprising at least one slip agent.

* * * * *